United States Patent
Ara et al.

(10) Patent No.: US 9,058,587 B2
(45) Date of Patent: Jun. 16, 2015

(54) COMMUNICATION SUPPORT DEVICE, COMMUNICATION SUPPORT SYSTEM, AND COMMUNICATION SUPPORT METHOD

(75) Inventors: Koji Ara, Higashiyamato (JP); Kazuo Yano, Hino (JP); Nobuo Sato, Saitama (JP); Satomi Tsuji, Koganei (JP); Yoshihiro Wakisaka, Kunitachi (JP); Norio Ohkubo, Tokyo (JP); Youichi Horii, Mataka (JP)

(73) Assignee: HITACHI, LTD., Tokyo (JP)

(*) Notice: Subject to any disclaimer, the term of this patent is extended or adjusted under 35 U.S.C. 154(b) by 750 days.

(21) Appl. No.: 13/262,673

(22) PCT Filed: Mar. 4, 2010

(86) PCT No.: PCT/JP2010/054068
§ 371 (c)(1),
(2), (4) Date: Dec. 7, 2011

(87) PCT Pub. No.: WO2010/113614
PCT Pub. Date: Oct. 7, 2010

(65) Prior Publication Data
US 2012/0086579 A1    Apr. 12, 2012

(30) Foreign Application Priority Data
Apr. 3, 2009   (JP) .................... 2009-090646

(51) Int. Cl.
G08B 3/00    (2006.01)
B08B 9/00    (2006.01)
(Continued)

(52) U.S. Cl.
CPC ............ *G06Q 10/10* (2013.01); *G06Q 10/063* (2013.01)

(58) Field of Classification Search
None
See application file for complete search history.

(56) References Cited

U.S. PATENT DOCUMENTS 7,519,542 B1 * 4/2009 Waingold .............. 705/7.11
8,392,335 B2 * 3/2013 Waingold .............. 705/319
(Continued)

FOREIGN PATENT DOCUMENTS

| JP | 2008-210363 | 9/2008 |
| JP | 2008-287690 | 11/2008 |
| JP | 2010-198261 | 9/2010 |

OTHER PUBLICATIONS

Takeshi Tanaka et al., Life Microscope: Continuous Daily-Activity Recording System with Tiny wireless Sensor, IEEE International Conference on Networked Sensing Systems, Jun. 17, 2008.
(Continued)

*Primary Examiner* — Julie Lieu
(74) *Attorney, Agent, or Firm* — Baker Botts L.L.P.

(57) ABSTRACT

It is provided a communication support device, which analyzes communications among a plurality of persons who belong to an organization, comprising a recording module for storing data that indicates the communications among the plurality of persons, a network constructing module for constructing a network structure of the plurality of persons from the data that indicates the communications, a improvement candidate determining module for identifying a first person whose communication is to be improved from the data that indicates the communications, and a connection candidate determining module for identifying a second person and a third person who can help increase triangle structures around the identified first person in the network structure, based on the network structure. The communication support device outputs display data for prompting the second person and the third person to communicate with each other.

14 Claims, 27 Drawing Sheets

(51) Int. Cl.
*G09F 25/00* (2006.01)
*G06Q 10/00* (2012.01)
*G06Q 10/10* (2012.01)
*G06Q 10/06* (2012.01)

(56) References Cited

U.S. PATENT DOCUMENTS

| | | | |
|---|---|---|---|
| 2002/0065708 A1* | 5/2002 | Senay et al. | 705/10 |
| 2008/0183525 A1 | 7/2008 | Tsuji et al. | |
| 2008/0263080 A1 | 10/2008 | Fukuma et al. | |
| 2009/0012833 A1* | 1/2009 | Kuhlke et al. | 705/9 |
| 2009/0319288 A1* | 12/2009 | Slaney et al. | 705/1 |
| 2010/0289640 A1* | 11/2010 | Annamalai | 340/539.13 |
| 2011/0072052 A1* | 3/2011 | Skarin et al. | 707/794 |
| 2013/0054716 A1* | 2/2013 | Levinson et al. | 709/206 |
| 2013/0091540 A1* | 4/2013 | Chen et al. | 726/1 |
| 2013/0110565 A1* | 5/2013 | Means et al. | 705/7.11 |
| 2013/0110583 A1* | 5/2013 | Ormont et al. | 705/7.29 |
| 2013/0110641 A1* | 5/2013 | Ormont et al. | 705/14.66 |
| 2014/0085101 A1* | 3/2014 | Rahman et al. | 340/870.01 |

OTHER PUBLICATIONS

Daniel Olguin Olguin, et al. Sensible Organizations: Technology and Methodology for Automatically Measuring Organizational Behavior, IEEE Transactions on Systems, Man, and Cybernetics—Part B: Cybernetics, Feb. 2009, vol. 39, No. 1.

Lynn Wu et al., Mining Face-To-Face Interaction Networks Using Sociometric Badges: Predicting Productivity in an IT Configuration Task, Twenty Ninth International Conference on Information Systems, Paris 2008.

Satomi Tsuji et al., Visualization Method Communication-Style by "Business Microscope", The Institute of Electronics, Information and Communication Engineers, IEICE Technical Report HCS2007-45 (Sep. 2007).

* cited by examiner

ACTIVITY HISTORY       BMF6

| MEMBER | MEDIATOR | FACE-TO-FACE DATE/TIME | FACE-TO-FACE PERIOD | RESULT | SATISFACTION LEVEL | ACTIVENESS |
|---|---|---|---|---|---|---|
| 2, 3, 6 | 2 | 03/06 10:01 | 60min | 4 | 1 | 2 |
| 1, 4, 5 | 5 | 03/07 16:32 | 15min | 2 | 3 | 3 |
| 1, 2, 3 | 2 | 03/08 19:20 | 50min | 5 | 1 | 2 |

*Fig. 15B*

ACTIVITY PERFORMANCE       BMF7

| MEMBER | MEDIATION COUNT | AVERAGE FACE-TO-FACE PERIOD | AVERAGE RESULT | AVERAGE SATISFACTION LEVEL | AVERAGE ACTIVENESS |
|---|---|---|---|---|---|
| 1 | 2 | 60min | 4 | 1 | 2 |
| 2 | 5 | 15min | 2 | 3 | 3 |
| 3 | 2 | 50min | 5 | 1 | 2 |

| RANK | MEDIATION COUNT | AVERAGE FACE-TO-FACE PERIOD | AVERAGE RESULT | AVERAGE SATISFACTION LEVEL | AVERAGE ACTIVENESS |
|---|---|---|---|---|---|
| HIGHER RANK | 2 | 60min | 4 | 1 | 2 |
| MIDDLE RANK | 5 | 15min | 2 | 3 | 3 |
| LOWER RANK | 2 | 50min | 5 | 1 | 2 |
| HIGHER ACTIVENESS | 5 | 15min | 2 | 3 | 3 |
| HIGHER COHESION | 2 | 50min | 5 | 1 | 2 |

*Fig. 15C*

```
                                    ⟋BMHG
    ┌─────────────────────────────────┐
    │      NUMBER OF TRIANGLES        │
    │   AROUND MR./MS. ARAI: TWO      │
    │    • HONDA - YOU - YUKAWA       │
    │    • TOGAWA - YOU - WAKUI       │
    │                                 │
    │                                 │
    │                                 │
    │                                 │
    └─────────────────────────────────┘
```

Fig. 17G

```
                                    ⟋BMHH
    ┌─────────────────────────────────┐
    │ NUMBER OF NON-TRIANGLE STRUCTURES│
    │ AROUND MR./MS. ARAI: EIGHT      │
    │  • YUKAWA - YOU - TOGAWA        │
    │  • YUKAWA - YOU - WAKUI         │
    │  • YUKAWA-YOU-WADA              │
    │  • TOGAWA - YOU - WADA          │
    │  • TOGAWA - YOU - HONDA         │
    │  • WAKUI - YOU - WADA           │
    │  • WAKUI - YOU - HONDA          │
    │  • WADA - YOU - HONDA           │
    │ YOU ARE THE CONNECTION BETWEEN THE│
    │ OTHER TWO. THINK OF WHAT THE THREE│
    │ OF YOU CAN DO.                  │
    └─────────────────────────────────┘
```

Fig. 17H

COMMUNICATION SUPPORT DEVICE, COMMUNICATION SUPPORT SYSTEM, AND COMMUNICATION SUPPORT METHOD

BACKGROUND OF THE INVENTION

This invention relates to a system for supporting communications within an organization, and more particularly, to a technology for improving communications of an organization.

In recent years, sensor network systems constituted of a small-sized wireless sensor node (hereinafter, referred to as sensor node) which is equipped with a sensor function, a relay terminal, a base station, and a sensor net management server (hereinafter, referred to as management server) are being developed. The sensor node measures the state or the like (sensor data) of a person or a place, and the measured sensor data is relayed to the relay terminal by multi-hopping to be transmitted to the management server via the base station. The management server executes various types of processing based on the received sensor data.

The key device in a sensor network system is the sensor node, which has the characteristics of being small and low power. The sensor node can be attached anywhere including environments and people because of its small size, and can run for several years on a battery without being fed from an external power supply because of its low power. Efforts to make the sensor node wearable are advancing steadily. Researches are underway on a wrist band-type device for measuring pulse and temperature constantly as discussed in Non Patent Literature 1 and on a name tag-type device for measuring with infrared rays the amount of face-to-face communication between persons and the amount of speech as discussed in Non Patent Literature 2.

Researches on the analysis of the relation between a communication pattern in an organization and productivity that uses a name tag-type wearable sensor have also started. In Non Patent Literature 3, nine hundred business operations that involve system configuration within an office have been studied to statistically analyze the relation between the length of time from the reception of a configuration request to the completion of the configuration and a communication pattern. In addition to the simple length of communication and personnel count, various communication patterns have been made into indices to be examined in relation to productivity. The obtained conclusion is that, while there is no relation between the simple length of communication or personnel count and productivity, a person higher in an index called cohesion has higher productivity.

In researches on an organization network as in Non Patent Literature 3, communications in an organization is primarily expressed by a network graph in which each employee is treated as one node and the amount of communication between employees is represented by a line between nodes. The line between nodes is drawn when the amount of communication between employees is equal to or larger than a certain threshold. For example, five minutes or more of communication per day on average is defined as a significant communication to exclude a brief contact which lasts less than five minutes, such as when employees simply pass each other or simply exchange greetings. The above-mentioned cohesion indicates, for each node in the graph, the crossline density of the network around the node, and is also called a clustering coefficient. The cohesion is specifically an index indicating the proportion of adjacent nodes that are connected to one node and that are also connected to each other. In the case where one node A has N adjacent nodes, there are N(N−1)/2 connections if every two nodes selected from among the N nodes are connected to each other. The cohesion is the ratio of actual connections out of all possible connections and, when the number of actual connections is M, for example, is calculated as M/N(N−1)/2).

CITATION LIST

Non Patent Literature

Non Patent Literature 1: Takeshi Tanaka et al., "Life Microscope: Continuous Daily-Activity Recording System with Tiny Wireless Sensor," IEEE International Conference on Networked Sensing Systems, Jun. 17, 2008.

Non Patent Literature 2: Daniel Olguin Olguin, "Sensible Organizations: Technology and Methodology for Automatically Measuring Organizational Behavior." IEEE Transactions on Systems, Man, and Cybernetics-Part B: Cybernetics. Vol. 39, No. 1, February, 2009.

Non Patent Literature 3: Lynn Wu et al., "Mining Face-to-Face Interaction Networks Using Sociometric Badges: Predicting Productivity in an IT Configuration Task", Twenty Ninth International Conference on Information Systems, Dec. 14, 2008.

SUMMARY OF THE INVENTION

The inventors of this invention have conducted a research on the relation between changes with time of the cohesion and the quality of business operation reports in a certain organization, and have found that an improvement in cohesion by 1.5 times in six months has coincided with an improvement in the creativity index of business operation reports by 1.8 times. Thus, there are various examples where high cohesion correlates to productivity, creativity, and views on worthwhileness. Similarly, it is imagined that there are cases where cohesion correlates to a productivity index unique to another organization and to KPI.

"Low cohesion" means that many of adjacent nodes are not connected to each other in the network graph. This is graphically expressed as a V-shaped connection structure formed between two adjacent nodes around a node in question. "High cohesion", on the other hand, means that there are many triangles in the graph where adjacent nodes are connected to each other at a high ratio. An organization with high cohesion can be paraphrased as an organization with many triangle structures on the network. In the following description, high cohesion on a network and the copiousness of triangles are treated as synonymous with each other. Increasing triangles in number means, simply, increasing communications between nodes that form a V shape in a manner that raises cohesion.

The copiousness or sparseness of triangle structures and productivity relate to each other presumably for the following reasons. For instance, when there are few triangles around one person, this person could be a bottleneck in the circulation of information and the flow of decision making. When there are many triangles, it also increases the organization's resistance against a sudden change to the environment brought on by, for example, someone being overburdened or becoming unable to do work for some reason. One of procedures where a triangle is formed on the graph is to hold a communication between one person and a person two paths away on the graph from the one person. A person who communicates often with not only a person one path away but also with a person two paths away is likely to obtain various types of information and accomplish high productivity. In the case of an organization containing several groups, as the number of triangles between groups increases, cooperation between the groups which is slight at first grows stronger and may induce new business operations and new suggestions.

Ideally, everyone communicates with everyone, maximizing the number of triangles. However, a communication needs time. In the case of an organization with several tens people, taking time to communicate closely with every employee is difficult to practice. There are also many other business operations than communicating to consider, and it is necessary to communicate effectively with selected people using a limited amount of time. In such situations, actually making use of the knowledge that the copiousness of triangles and productivity are related to each other in the organization creates various problems listed below, and increasing triangles in an actual office is difficult.

The first reason is that it is difficult for communicating persons and an administrator responsible for the management of the organization to grasp, at some point in business operation, in real time, which persons need to communicate with each other in order to increase triangles. In an experiment where sensor devices have been distributed to experiment subjects to actually measure a communication network, and each experiment subject has been asked to estimate where around himself/herself triangles are, in other words, whether or not persons with whom he/she communicates are communicating with each other. However, it has been difficult for him to estimate with high precision.

The second reason is that, even though a goal to increase triangles through communications between one person and another has been set, there is no way for the persons or an administrator to know in real time whether or not triangles have actually been formed. The resultant problems are that enough triangles are not formed and that more time is spent on communications after a triangle is already formed. In addition, there is no way of knowing whether or not a communication that has been held between persons intending to communicate more has actually been active, namely, the quality of the communication. There is no way of knowing whether the communication is an encounter where the persons just happen to be in the same place at the same time, or a productive discussion.

The third reason is that, despite willingness to increase triangles, persons who have never met each other will take time to share the mind because they do not know each other's background and specialty. If they cannot manage to find a common topic in a limited amount of time, they may be unable to have more than a fleeting conversation and fail to subsequently develop a continuing communication. A member selection method that allows members to share each other's background and interest in a short period of time is needed.

The fourth reason is that a disclosure/running method that is smoothly incorporated in the main business operation in order to make increasing triangles an activity during business operation. In the case of a mechanism that makes people meet each other and spend time only for increasing triangles will not work when the main business operation is busy.

The fifth reason is that the records of cases where triangles have been successfully increased and cases where attempts to increase triangles have failed are not accumulated, despite the fact that this is necessary to increase triangles continuously and efficiently. This information needs to be accumulated and reflected in the next occasion. Otherwise, it is just an aggregation of temporary communications and does not advance the main business operation.

The sixth reason is that, while triangles need to be increased within one department, it is also necessary to increase triangles between one department and another department. An increase of triangles within a department enhances the expertise and productivity of the department. On the other hand, a new business or product is often born at the boundary between departments, and it is also significant to increase triangles between departments. A method that balances the two, instead of favoring only one of the two, is needed.

Because of the reasons given above, although it has been known that a person higher in cohesion accomplishes higher productivity, it has been difficult in practice to enhance cohesion, namely, to increase triangles.

The representative one of inventions disclosed in this application is outlined as follows.

There is provided a communication support device, which analyzes communications among a plurality of persons who belong to an organization, including: a recording module for storing data that indicates the communications among the plurality of persons; a network constructing module for constructing a network structure of the plurality of persons from the data that indicates the communications; a improvement candidate determining module for identifying a first person whose communication is to be improved from the data that indicates the communications; and a connection candidate determining module for identifying a second person and a third person who can help increase triangle structures around the identified first person in the network structure based on the network structure. The communication support device outputs display data for prompting the second person and the third person to communicate with each other.

Further, there is provided a communication support system including: a plurality of terminals which are held respectively by a plurality of persons belonging to an organization; and a computer for processing data that is transmitted from the plurality of terminals to analyze communications among the plurality of persons. The plurality of terminals each include: a sensor for obtaining data that indicates a communication with a person who holds another one of the plurality of terminals; and a transmitting module for transmitting the data that indicates the communication to the computer. The computer includes: a recording module for storing the data that indicates the communication; a network constructing module for constructing a network structure of the plurality of persons from the data that indicates the communication; a improvement candidate determining module for identifying a first person whose communication is to be improved from the data that indicates the communication; and a connection candidate determining module for identifying a second person and a third person who can help increase triangle structures around the first person in the network structure based on the network structure. The computer outputs display data for prompting the second person and the third person to communicate with each other.

Further, there is provided a communication support method, which analyzes communications among a plurality of persons who belongs to an organization, including the steps of: storing data that indicates the communications among the plurality of persons; constructing a network structure of the plurality of persons from the data that indicates the communications; identifying a first person whose communication is to be improved from the data that indicates the communications; identifying a second person and a third person who can help increase triangle structures around the first person in the network structure based on the network structure; and outputting display data for prompting the second person and the third person to communicate with each other.

This invention efficiently enhances the density of communications within an organization in a limited amount of time and increases triangle structures in number in a network. The productivity of the organization and the motivations of the individuals, among others, are thus improved.

BRIEF DESCRIPTION OF THE DRAWINGS

FIG. 15B is a diagram illustrating an example of an activity history database according to the fourth embodiment of this invention.

FIG. 15C is a diagram illustrating an example of an activity performance database according to the fourth embodiment of this invention.

FIGS. 17A to 17H are diagrams illustrating an example of a screen that displays a comparison between actual performance and prediction of communications according to the fourth embodiment of this invention.

DETAILED DESCRIPTION OF THE PREFERRED EMBODIMENTS

Figure 1:
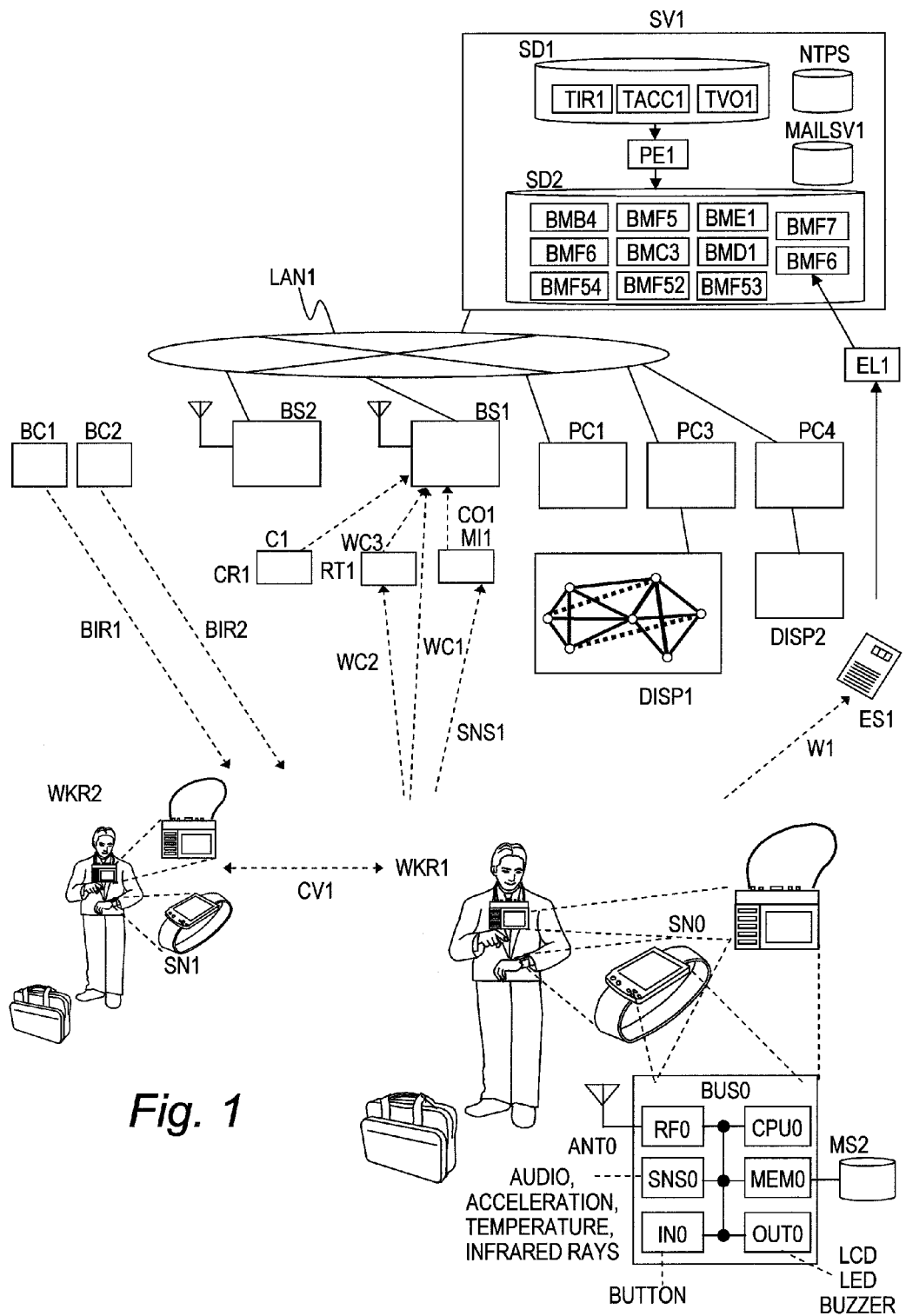
FIG. 1 is a diagram illustrating an example of the configuration of a sensor network system according to a first embodiment of this invention.

This invention improves communications of an organization by analyzing data that indicates the current communications among persons constituting the organization. Particularly, this invention has a feature that by focusing attention on cohesion, namely, a triangle structure, that has a strong correlation to the productivity of the organization, and extracting a person who is desired to have more communications, a suggestion is made to prompt the person to increase triangle structures.

More specifically, face-to-face communications are recorded as needed for organization network analysis, which two persons need to have more communications with each other in order to increase triangle structures is automatically analyzed to form a pair, and the formed pair is displayed in real time on a display, the Web, or a sensing device to thereby make a suggestion to the persons who should communicate and a manager who manages these persons.

This invention also includes constant monitoring for the emergence of the suggested communication and, if the suggested communication actually takes place, the persons concerned and their manager are notified by real-time display on a display, the Web, or a sensing device. Data indicating a communication and the activeness of workers are also detected to determine the activeness of individuals when they are face to face and the quality of a conversation between members.

In addition to two persons who are desired to have more communications with each other, a person who often communicates with the two, namely, a common acquaintance, is determined from network information. This person is given the roles of a communication host, a discussion leader, and a facilitator. Information that prompts these three including the host to communicate is displayed in real time on a display, the Web, or a sensing device. Giving a person the role of a host enables the person to draw out topics and interests shared by the other two.

Further, based on information about business operations critical to the organization and information about communications to be increased which is calculated from actual communication information, members are periodically allocated to teams in a manner that efficiently increases triangles in the organization while ensuring that the business operations are actually done.

This invention further includes monitoring a suggested communication and recording the activeness of the communication as an evaluation of each participant and an evaluation of the host. The next time communication members are determined, the recorded information is used to identify who is good at triangle communication and the facilitation of triangle communication, and who is not, and the identification is reflected on member selection. The triangles can thus be increased continuously and efficiently.

The data indicating a communication between persons which is described above can be face-to-face information obtained via a sensor device, mail transmission/reception information obtained from the log of a PC or a cell phone, chat history information, or the like. The face-to-face data obtained via a sensor device is taken as an example in the following description of embodiments.

First Embodiment

Embodiments of this invention are described in detail below with reference to the drawings. Components denoted by the same reference symbols are components having the same or similar configurations.

FIG. 1 illustrates the basic configuration of a system of this embodiment. A worker WKR1 keeps a sensor node SN0 packaged as a wrist band or a name tag. Inside the sensor node SN0, an interface bus BUS0 connects a processor circuit CPU0, a radio frequency circuit RF0, a sensor SNS0, which obtains information such as audio, acceleration, temperature, and infrared rays, a memory MEM0, which stores a sensing program MS2, a button IN0, and an output device OUT0, which is an LCD, an LED, a buzzer, or the like. The sensor node SN0 includes an antenna ANT0 for communicating by radio. The infrared sensor allows the detection of a pulse in the case of the wrist band type, and the detection of an opposed infrared device in the case of the name tag type. Specifically, when the worker WKR1 and another worker WKR2 each wearing the name tag-type sensor node SN0 face each other, their face-to-face communication with each other can be detected through an infrared communication CV1. Information sensed by the sensor node SN0 is sent to a base station device BS1 through a wireless communication WC1, or through wireless communications WC2 and WC3 which are made via a relay terminal RT1. The sensor node SN0 may be connected to a device CR1 to transmit data through a cable connection C1. The device CR1 may double as a charger. The information received by the base station BS1 is stored in a sensor database SD1 of a management server SV1 via a cable network LAN1. Other than SD1, the management server SV1 has a database SD2 to store various types of data that are obtained through various types of processing described later. The management server SV1 may be a single device as illustrated, or may be implemented as separate servers, namely, a data server for storing the data SD1 and an application server for storing the other data SD2 and a processing program PE1.

A computer PC1 which is used by a worker is connected to LAN1 by a cable or by a wireless LAN. Computers PC3 and PC4 for displaying obtained data are also connected to LAN1. The computer PC3 is connected to a display DISP1 in order to display data collected on the server SV1. Similarly, a display DISP2 is connected to PC4 to display data. Different displays may display the same contents, or a display set up in a room may display only information about workers who work in the room.

A camera CO1 and a microphone MI1 are connected to the base station BS1. A conversation CV1 with the other worker WKR2 is sensed (sensing SNS1) by the microphone MI1.

A worker writes (W1) results such as a work quality and a satisfaction level on a questionnaire sheet ES1, and the results are computerized (EL1) manually or through OCR to be stored on the server SV1.

Infrared emitting devices BC1 and BC2 respectively emit infrared rays BIR1 and BIR2 at regular intervals, and are installed in such places as a conference room, a laboratory, and a cafeteria. When the worker WKR1 wearing the name tag-type sensor device SN0 works in front of one of the infrared emitting devices, the sensor node SN0 detects one of the infrared rays BIR1 and BIR2. The detected information is transmitted through the wireless communication WC1, and the management server is informed of the work location of each worker in this manner.

The management server SV1 houses an NTP server NTPS for time management, and manages accurate time by, for example, regularly referring to the standard time on the Internet.

A mail server MAILSV1 keeps mail received by a worker and mail transmitted by a worker.

The program PE1 contains various processing programs described in the subsequent embodiments which generate various types of data stored in SD2.

Figure 22:
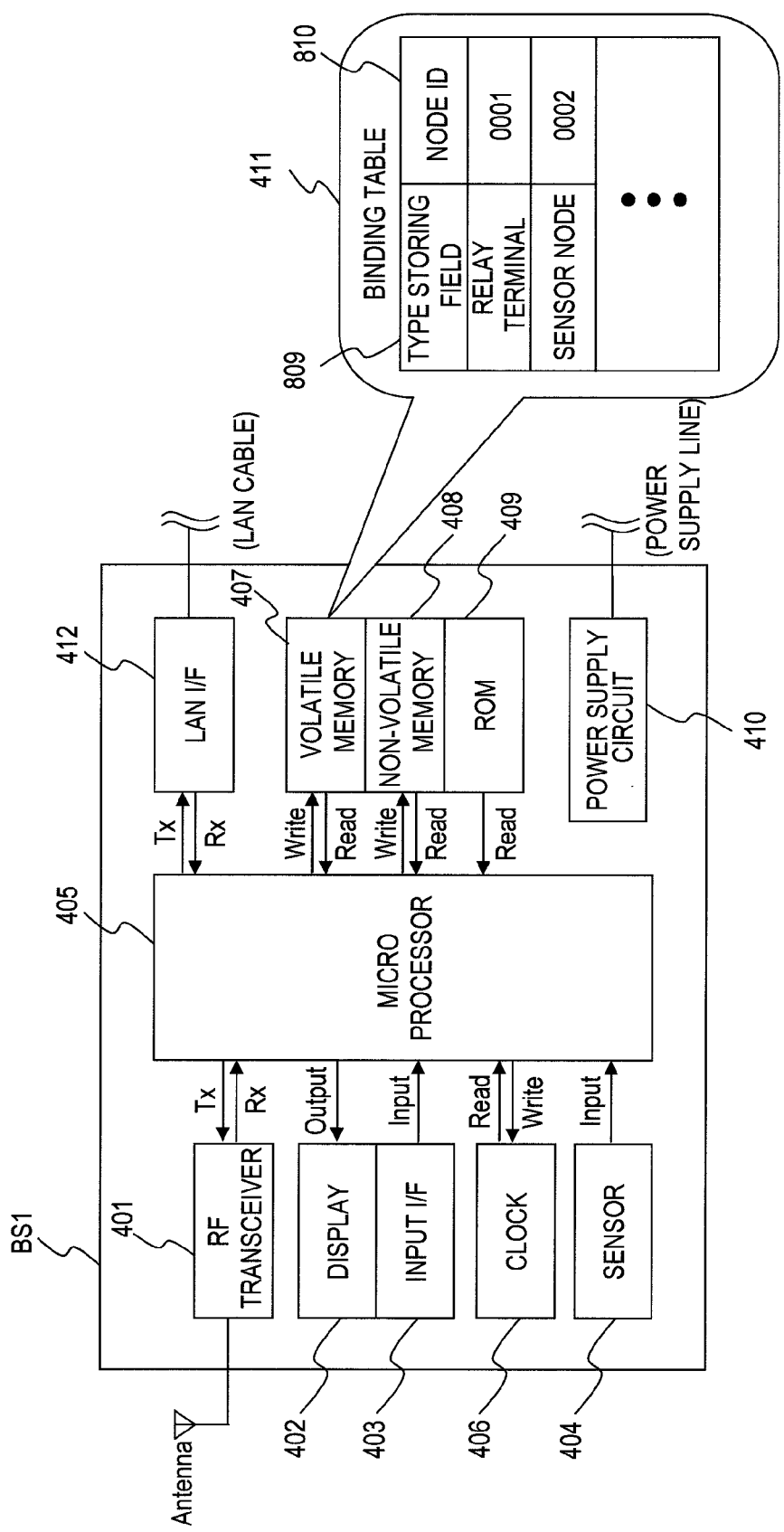
FIG. 22 is a block diagram illustrating an example of the hardware configuration of a base station according to the first embodiment of this invention.

FIG. 22 is a diagram illustrating a concrete example of the hardware configuration of the base station BS1 in the sensor network system of FIG. 1.

The base station includes an RF transceiver 401 for wireless transmission/reception, a display 402, a button 403, sensor(s) 404, a micro processor 405, a real-time clock 406 having absolute time, a volatile memory 407, a nonvolatile memory 408, a read-only memory 409, a power supply circuit 410, and a LAN I/F 412 for communicating with the management server SV1 via an IP network. The volatile memory 407 stores a binding table 411 necessary to grasp and manage a device that is currently in operation and the type of the device. The binding table 411 holds a type storing field 809 for storing whether a registered node is a relay terminal or a sensor node and a node ID 810 uniquely assigned to the node.

The relay terminal RT1 has the same hardware configuration as that of the base station, except that the relay terminal RT1 does not have a LAN communication interface.

Figure 23:
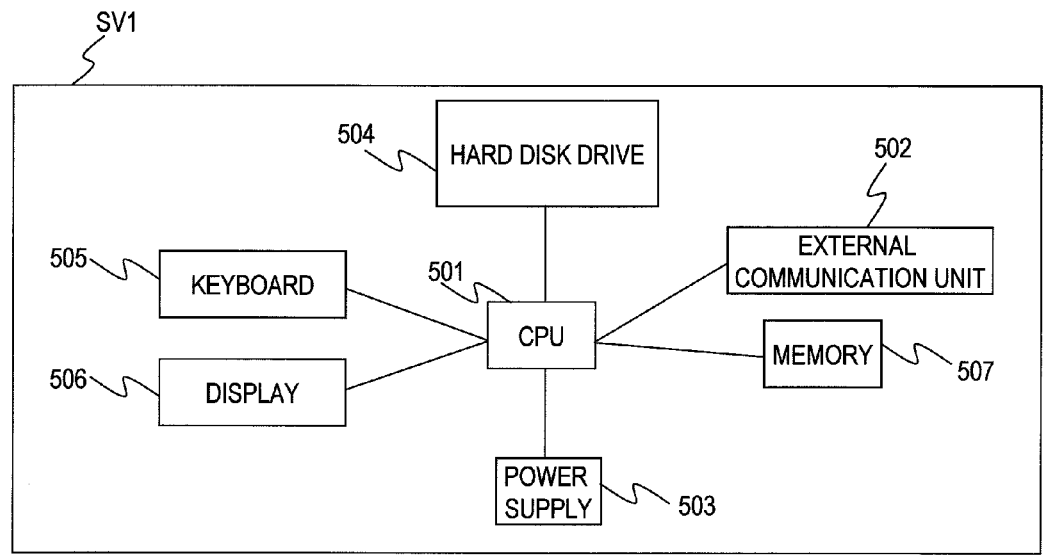
FIG. 23 is a block diagram illustrating an example of the hardware configuration of a management server according to the first embodiment of this invention.

FIG. 23 is a block diagram illustrating a concrete example of the hardware configuration of the management server SV1 in the sensor network system of FIG. 1.

The sensor net management server SV1 includes a processing unit (CPU) 501, an external communication unit 502, a power supply 503, a hard disk drive 504, a keyboard 505, which is an input device for inputting a command from a user, a display 506, which is a display device, and a memory 507.

The sensor net management server SV1 receives via the external communication unit 502 data that is collected by the base station BS1 from the sensor node SN1 through the relay terminal RT1. The CPU 501 reads a program such as middleware stored in the memory 507 and, following an instruction of the program, executes various types of processing described in this and other embodiments. The CPU 501 also processes data such as measurement values obtained through the external communication unit 502 to accumulate the data in the hard disk drive 504 and to display the data on the display 506. Concrete examples of the processing and displaying that are executed on the management server SV1 are given later. The CPU 501 interprets a user command input from the keyboard 505 and delivers the interpretation to the base station BS1 via the external communication unit 502.

Figure 2:
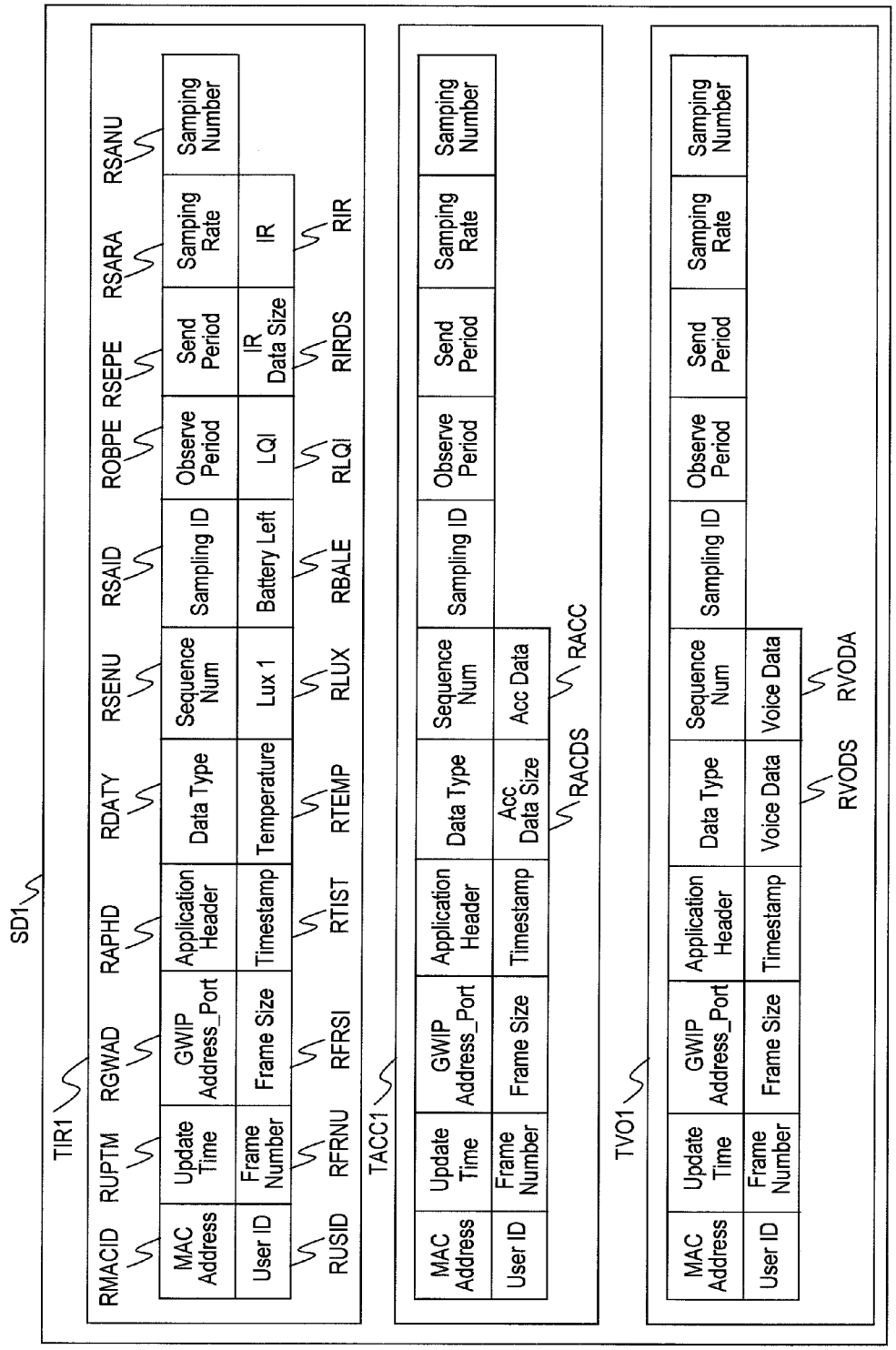
FIG. 2 is a diagram illustrating an example of the configuration of a table that stores sensor data according to the first embodiment of this invention.

FIG. 2 is a diagram illustrating an example of the configuration and data of the sensor data database SD1 which is stored in the management server SV1. The database SD1 is for managing sensor data, identification information of a sensor device used by a worker, identification information of the worker, and the like in association with one another.

A table TIR1 is a table for storing temperature data, illuminance data, and detected infrared data in association with one another. The network address of a device is stored in a column RMACID. The time at which data is stored in the database SD1 is recorded in a column RUPTM. The identifier of a base station device (for example, BS1) that has received the data by radio is stored in a column RGWAD. The type of the sensor device is stored in a column RAPHD. For example, "1" is stored in the case of a wrist band-type device and "2" is stored in the case of a name tag-type device. The type of the data stored in the wireless packet is stored in a column RDATY. For example, "1" is stored in the case of data that is stored as a set of temperature data, illuminance data, and detected infrared data, "2" is stored in the case of acceleration data, and "3" is stored in the case of audio data. A column RSENU is a sequence number ranging from 0000 to FFFF that indicates the order in which a frame is transmitted from the sensor device. The sequence number is a value of a periodic counter which is reset to 0000 after the counter counts up to FFFF. In the case where frame segments are combined, the sequence number of the first frame is stored in the column RSENU. In the case of frame segments containing pieces of data that are sampled in the same sensing cycle, the same sampling identifier is stored in a column RSAID. The current sensing interval of the sensor device is stored in a column ROBPE. The current wireless transmission interval of the sensor device is stored in a column RSEPE, in the form of a numerical value that indicates the interval or a multiple of the sensing interval. A cycle in which sensor data is obtained in the sensor device is stored in a column RSARA. The current sampling count of the node is stored in a column RSANU. An ID identifying a user who uses the device in question is stored in a column RUSID. In the case of a frame divided into n frame segments, a descending number ranging from n, n−1, n−2 ... to 3, 2, 1 is stored in a column RFRNU. When "1" is stored in the column RFRNU, the last frame segment 0 is the 256-th frame segment. The total number of a series of frame segments is stored in a column RFRSI. The time on the sensor device at which the data in question is obtained with the sensor is stored in a column RTIST. Temperature data obtained with the sensor device is stored in a column RTEMP. Illuminance data obtained with the sensor device is stored in a column RLUX. A value indicating the remaining battery charge of the sensor device, for example, a power supply voltage, is stored in a column RBALE. A value indicating the quality of wireless communication between the sensor device and a base station, for example, a link quality indicator (LQI), is stored in a column RLQI. The number of pieces of detected infrared data that are contained in the data in question is stored in a column RIRDS. Infrared data obtained with the sensor device is stored in a column RIR.

A table TACC1 holds data of the acceleration sensor in place of infrared data and relevant data of the table TIR1. The same contents as those of the table TIR1 are stored in columns RMACID to RTIST. The number of pieces of detected acceleration data that are contained in the data in question is stored in a column RACDS. Acceleration data stored with the sensor device is stored in a column RACC.

A table TVO1 holds audio data in place of the infrared data and relevant data of the table TIR1. The same contents as those of the table TIR1 are stored in columns RMACID to RTIST. The number of pieces of detected audio data that are contained in the data in question is stored in a column RVODS. Audio data obtained with the sensor device is stored in a column RVODA.

Figure 3:
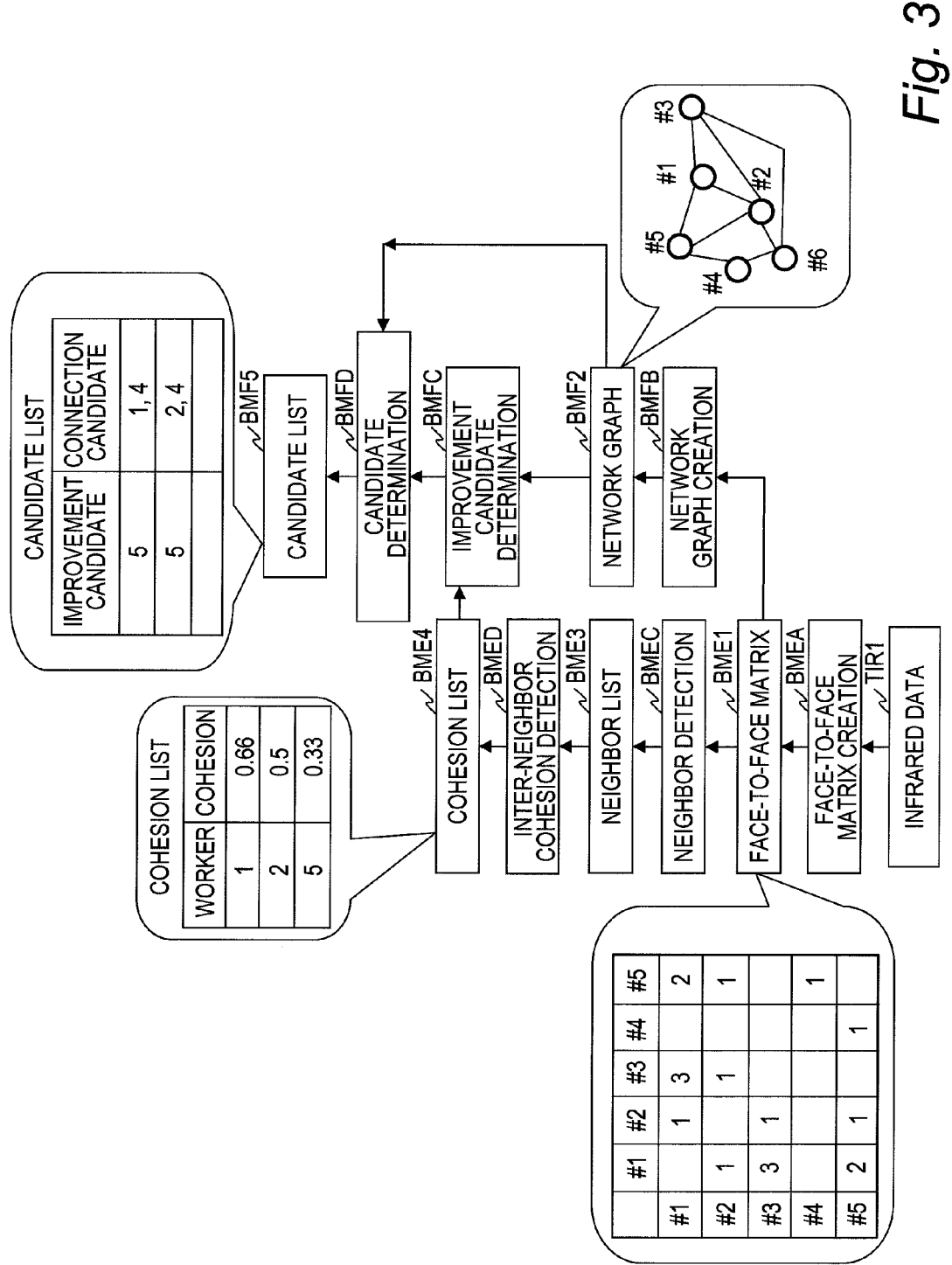
FIG. 3 is a flow chart of an example of calculating cohesion and a connection candidate according to the first embodiment of this invention.

In the system of the first embodiment, indices related to the face-to-face network include the number of communications which is calculated as the number of times face-to-face infrared detection is made within a given period. The calculation period may be a constant interval such as 24 hours or a week or, in the case of a business operation project that has a set period, may be the entire period from the beginning of the project to the set finish time. Described here is a calculation method for the case where the business operation cycle is one-day long and the past 24 hours are the calculation range. FIG. 3 illustrates the flow of this processing.

The cohesion of each worker at a time t is obtained through face-to-face matrix creation processing BMEA, neighbor detection processing BMEC, inter-neighbor cohesion detection processing BMED which are described below. A face-to-face matrix expresses in an n×n matrix the number of times every two persons out of n workers come to face-to-face with each other. The workers 1 to n are allocated to the rows in order and the workers 1 to n are similarly allocated to the columns in order. In the case where the worker i and the worker j have communicated m times, a value m is put in an element in the row i and the column j.

In the face-to-face matrix creation processing BMEA, the table TIR1 is referred to first to create a list by extracting detected infrared data TIR1 in a period between a time t in question and a time that goes back the calculation period, i.e., 24 hours (t minus 24 hours). Next, the number of times a communication has been had between one worker, i, and another worker, j, is obtained from the list, and the obtained value is stored in the element in the row i and the column j of a face-to-face matrix BME1. The communication count can be determined by a method in which the number of times infrared rays are detected with the sensor node SN0 is simply stored, or a method in which the detection count is converted into the length of time to be stored. In the latter method, the minimum unit is set to, for example, one minute and for how many minutes the two have faced each other is stored. The communication count is 1 no matter how many times two persons face each other within the same one-minute period. The following description of this embodiment takes the latter as an example. This is executed for every combination of i and j to complete the face-to-face matrix BME1.

In the next neighbor detection processing BMEC, a neighbor list BME3 is created for one worker i by extracting people who are directly communicating with i. A person who is directly communicating with the worker i can be identified by detecting a column of the face-to-face matrix BME1 that meets the row i and holds a value larger than 0. For example, in the case where the worker 1 has communicated with three people, the worker 2, the worker 3, and the worker 5, the list BME3 that reads as {2, 3, 5} is created.

In the next inter-neighbor cohesion detection processing BMED, first, two elements are picked out of the list BME3 at a time to determine whether or not there has been a communication between the two elements. For instance, from the neighbor list {2, 3, 5} of the worker 1, {2, 3}, {2, 5}, and {3, 5}, three pairs in total, are picked out. For each of the elements, whether or not the value of the relevant cell of the face-to-face matrix BME1 is larger than 0 is checked. In the case of {2, 3}, for example, an element in the row 2 and the column 3 of the face-to-face matrix BME1 and, if necessary, an element in the row 3 and the column 2 are examined, and it is deemed that there has been a communication when the element's value is larger than 0 whereas it is deemed that there has been no communication when the element's value is 0. A value obtained by dividing the number of elements that are deemed as having had a communication by the total number of pairs is the cohesion of the worker i in an inter-neighbor cohesion list BME4. For example, of the above-mentioned pairs {2, 3}, {2, 5}, and {3, 5}, communications between pair elements are confirmed in two pairs, {2, 3} and {2, 5}, but not in {3, 5}. The cohesion with respect to the worker i is accordingly ⅔ (0.67) and stored as an element i of an inter-neighbor cohesion list BME4. This calculation is performed for every worker to complete the cohesion list BME4. Values on this list are cohesion values of the respective workers at one time t.

As a method of identifying a person who should communicate, this cohesion list can be used to improve communication near a person who is low in cohesion, namely, a person with few triangles around him/her. For example, when the worker 5 is lower in cohesion than others as in a cohesion list of FIG. 3, this means that there are more triangles around the workers 1 and 2 than around the worker 5. The worker 5 is therefore selected in improvement candidate determination processing BMFC. A person determined as a subject to be improved may be one who has a relatively low cohesion as this, or may be one whose cohesion is smaller than a predetermined threshold.

Next, in candidate determination processing BMFD, two persons are identified who should communicate with each other in order to improve the cohesion of the worker 5 selected through the improvement candidate determination processing. The simplest way of enhancing the cohesion of the worker 5 is a method true to the definition of cohesion in which two persons who have not communicated with each other are identified from among workers who communicate with the worker 5 on a network graph BMF2, and the two are prompted to establish a communication with each other. The identified two are stored on a candidate list BMF5. The network graph BMF2 is created from the face-to-face matrix through network graph creation processing BMFB. The network graph can be created by a known method such as the spring model.

The method described above determines connection candidates after a subject to be improved is determined based on cohesion. Instead, connection candidates may be determined by other algorithms. For example, one way is to determine connection candidates by using how many triangles are gained as an evaluation index. In FIG. 3, for example, when a communication is established between the workers 2 and 4, two new triangles are simultaneously formed among the workers 2-4-5 and the workers 2-4-6. In this manner, triangles can be increased efficiently by calculating from the network graph the number of triangles that will be gained if a communication is established and preferentially determining as connection candidates persons whose communication with each other will bring the largest number of triangles gained.

The information on a connection candidate list obtained by the method described above is contained as communication prompting information in display data, and the management server outputs the display data in real time to a display, the web, or a sensing device, thereby making a suggestion to a person who should communicate and a manager who manages the person.

Figure 4:
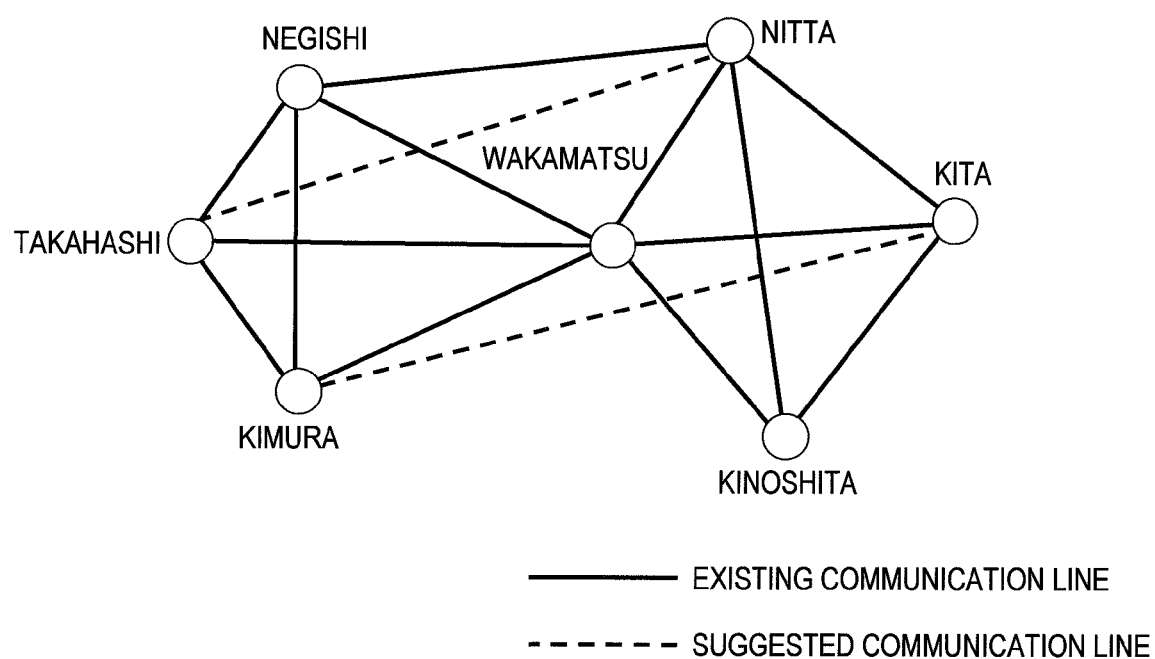
FIG. 4 is a diagram illustrating an example of a screen that suggests a communication according to the first embodiment of this invention.

FIG. 4 is an example of displaying the data on a display. A solid line, for example, is drawn as an existing communication line between two persons who have actually communicated with each other. A different type of line, for example, a line of a different color or a blinking line, is drawn as a suggested communication line between connection candidates who have been determined through the flow of FIG. 3. FIG. 4 illustrates an example in which a suggested communication line is displayed as a dotted line. FIG. 4 means, for example, a suggestion that a communication between Mr./Ms. Kita and Mr./Ms. Kimura be increased.

In this manner, the network structure is analyzed based on face-to-face information which is obtained from infrared data, and connection candidates, namely, persons who should communicate with each other, are extracted and displayed. This display method enables persons who should communicate and a manager who manages workers to grasp in a limited amount of time in real time which persons need to communicate with each other in order to increase triangles, and which persons are desired to communicate with each other next.

Figure 5:
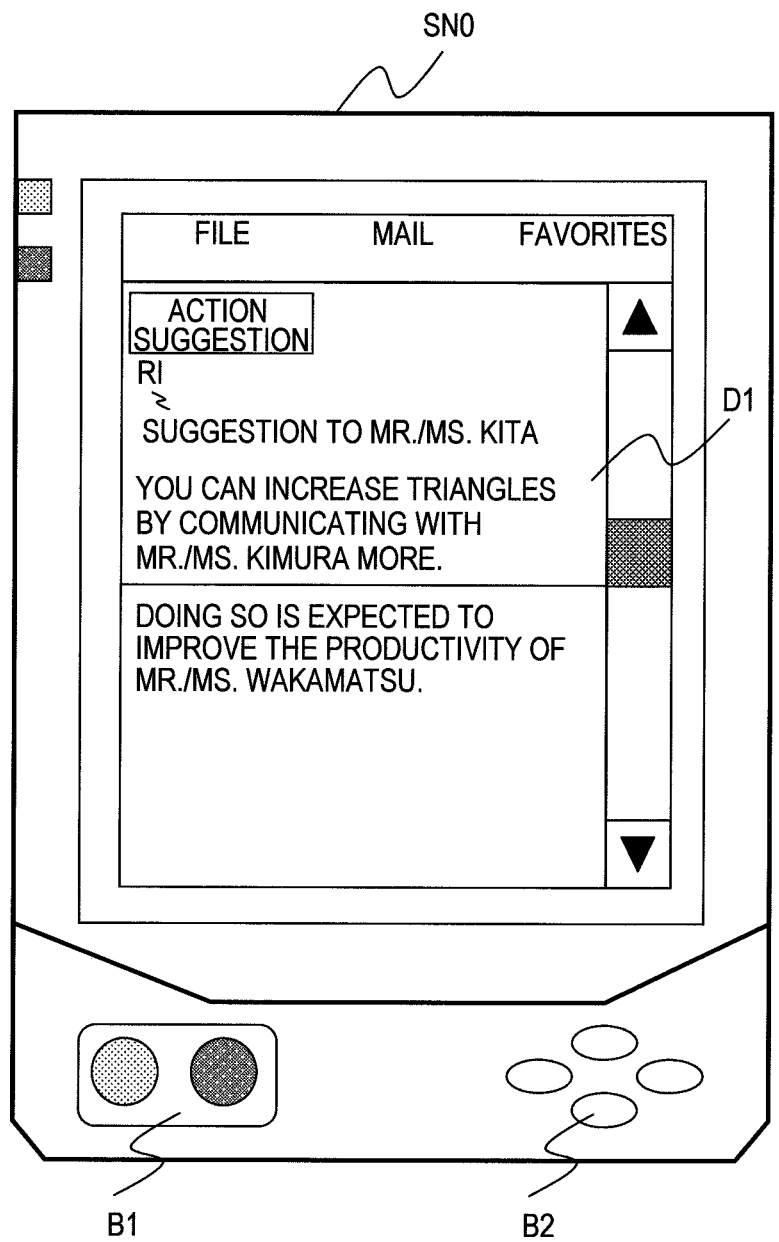
FIG. 5 is a diagram illustrating an example of a screen that suggests a communication according to the first embodiment of this invention.

FIG. 5 is an example of executing the transmission of the same information as in FIG. 4 to a sensor device that can display only a small amount of data via E-mail that can only carry text information. First, subjects to be improved and connection candidates are determined in the same manner as in FIG. 3. Next, based on the improvement candidate list, a message D1 as the one illustrated in FIG. 5 is transmitted to the device of each worker who is a connection candidate. The message D1 is created by processing information of a person with whom the connection candidate worker is to develop cohesion and information of a worker whose cohesion will be improved by the developed cohesion. FIG. 5 illustrates an example in which Mr./Ms. Kita wearing the sensor device SN0 is suggested that he/she should communicate more with Mr./Ms. Kimura, and notified that doing so improves the cohesion of Mr./Ms. Wakamatsu. A worker wearing the sensor device SN0 can thus know in real time with whom he/she should communicate by seeing a message displayed on the display screen of the sensor device. The worker can also understand whose productivity is to be improved by that communication and decide whether to communicate or not.

Second Embodiment

Figure 6:
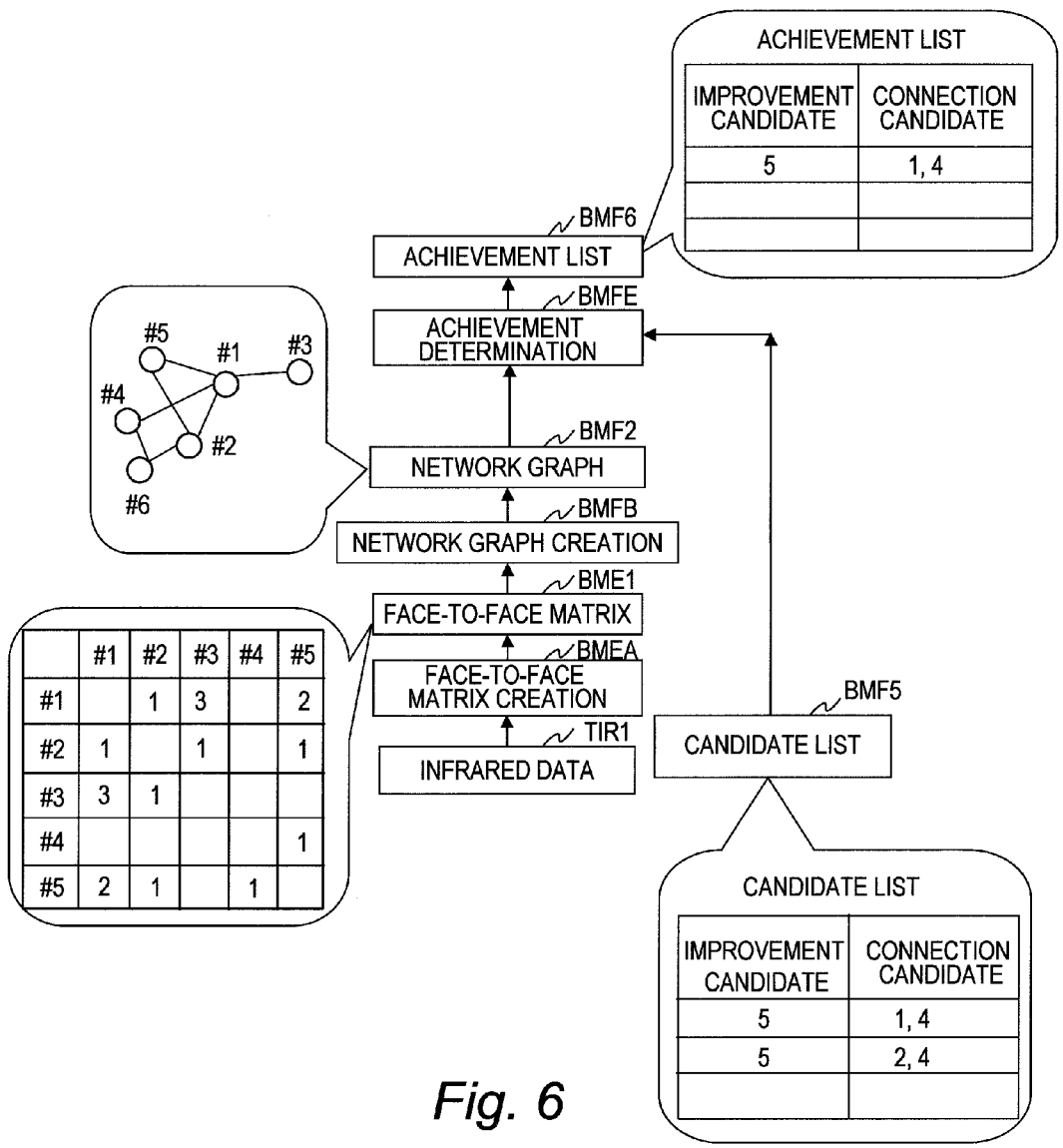
FIG. 6 is a flow chart of an example of calculating the degree of achievement according to a second embodiment of this invention.

FIG. 6 is a diagram illustrating an example of a system according to a second embodiment of this invention which determines whether or not a suggested communication has actually been held. This embodiment has a feature of determining whether or not the communications suggested in FIG. 4 and FIG. 5 have actually taken place. The network graph BMF2 is created periodically from infrared data through the same flow as that of FIG. 3.

Next, in achievement determination processing BMFE, information on the candidate list created in FIG. 3 is scanned in order, and whether or not a communication has been established between suggested connection candidates is determined based on the network graph BMF2. An established communication between connection candidates is stored in an achievement list BMF6. FIG. 6 illustrates an example in which a improvement candidate 5 and connection candidates 1 and 4 are picked up from the candidate list, and an established communication between the connection candidate 1 and 4 has been detected from the network graph and stored in the achievement list BMF6. The determination of whether or not a communication has been established may be made such that having communicated a given number of times or more is deemed as having an established communication.

Figure 7:
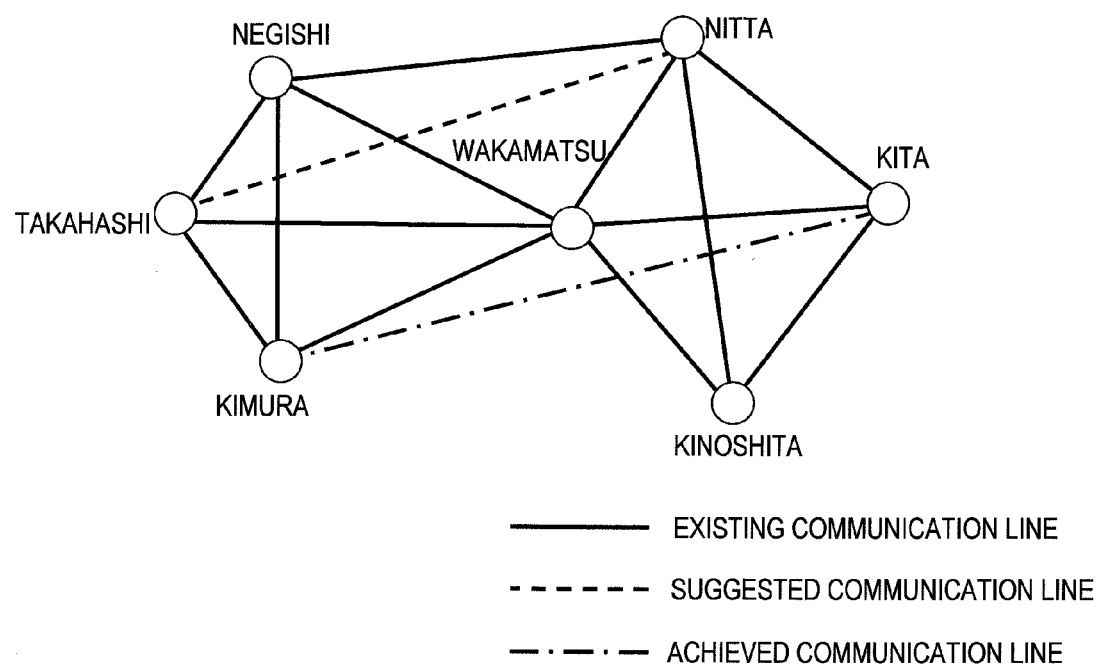
FIG. 7 is a diagram illustrating an example of a screen that displays the degree of achievement in communication according to the second embodiment of this invention.

FIG. 7 is an example of displaying information that is obtained through the achievement determination of FIG. 6 on a display or the like for workers who should communicate and a manager who manages the workers. When a suggestion has been made, suggested communication lines have been drawn between Mr./Ms. Kita and Mr./Ms. Kimura and between Mr./Ms. Nitta and Mr./Ms. Takahashi as illustrated in FIG. 4. The achievement list obtained in FIG. 6 is now referred to in order to grasp which pair has actually communicated, and a different type of line which differs from the existing communication lines and suggested communication lines of FIG. 4 is drawn on the display as an achieved communication line between these two persons. In FIG. 7, the achieved communication line is displayed as a dot-dash line and indicates that a communication has been established between Mr./Ms. Kita and Mr./Ms. Kimura. The displayed line between a pair who have been suggested communicating more in FIG. 4 but have not succeeded in complying to the suggestion remains a suggested communication line. For instance, the displayed line between Mr./Ms. Takahashi and Mr./Ms. Nitta is still a suggested communication line in FIG. 7. By seeing these results, the workers and the manager can find out in real time whether making a suggestion has led to the actual formation of a triangle structure or not. The workers and the manager can further decide whether to continue the suggested communication and grasp which worker is reacting positively to the system's suggestion.

Figure 8:
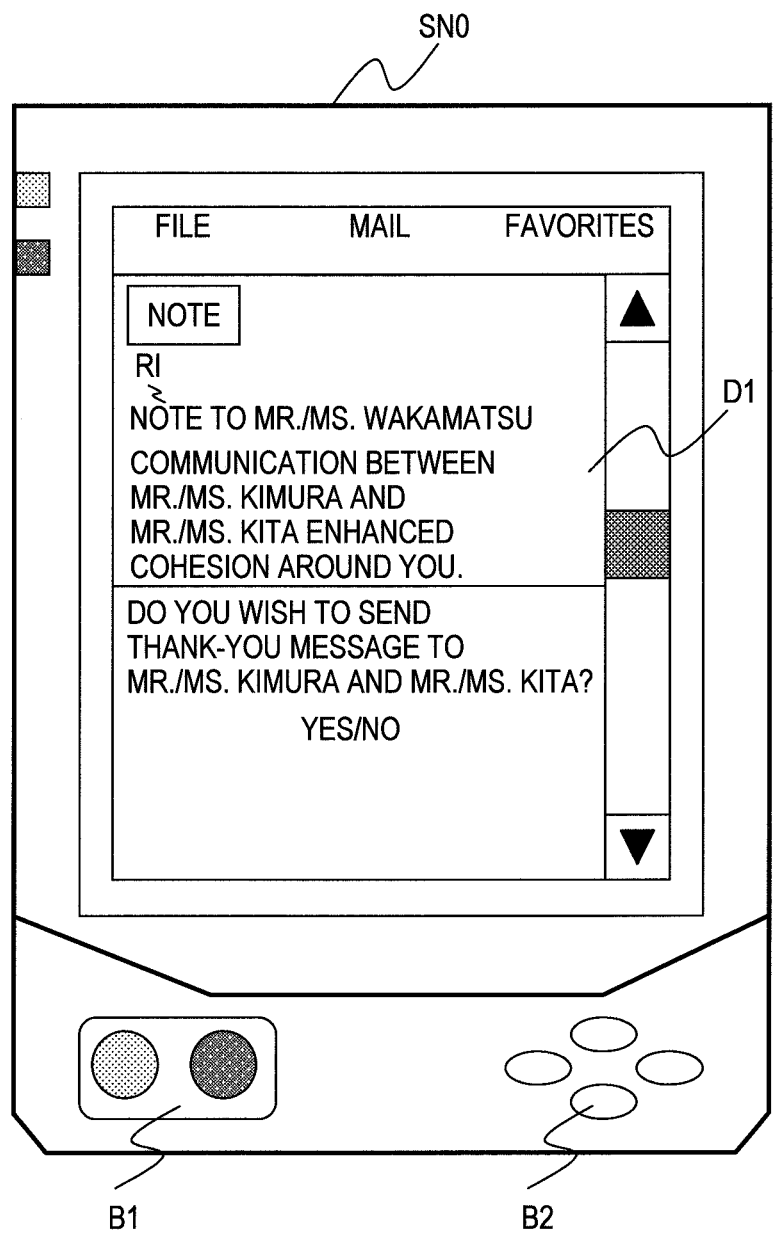
FIG. 8 is a diagram illustrating another example of the screen that displays the degree of achievement in communication according to the second embodiment of this invention.
Figure 9:
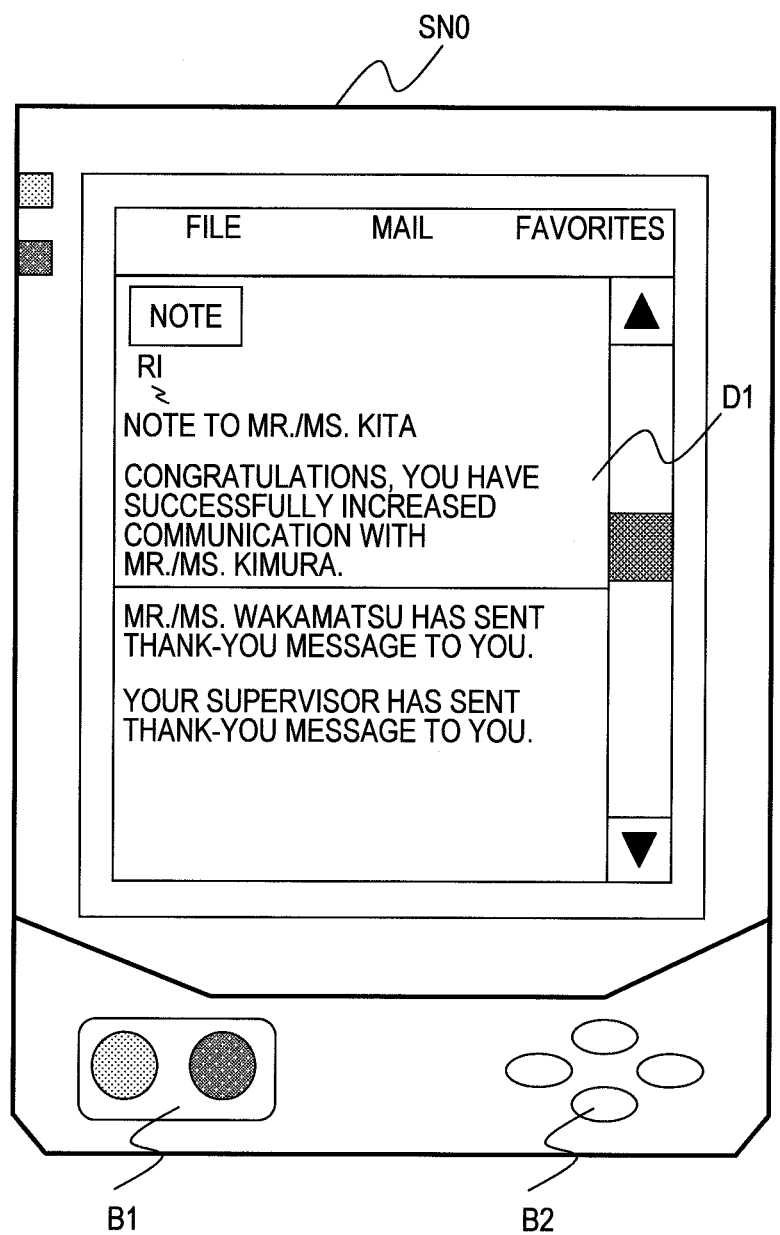
FIG. 9 is a diagram illustrating still another example of the screen that displays the degree of achievement in communication according to the second embodiment of this invention.

FIG. 8 and FIG. 9 illustrate examples in which the same information that is displayed as an achieved communication line in FIG. 7 is notified to persons concerned with the achieved communication line. FIG. 8 illustrates a message to the subject to be improved whose cohesion has been improved by the addition of the achieved communication line. The management server identifies a subject to be improved from the achievement list of FIG. 6, sends information of connection candidate to the sensor node SN0 of the identified person, and displays the information processed into a message as the one illustrated in FIG. 8. Displaying the information in this manner allows the subject to be improved to grasp which workers have made effort in order to improve the subject's productivity. The subject to be improved can use buttons B1 and B2 on the sensor node SN0 to select or create a thank-you message addressed to the workers who have made efforts for the subject and to transmit the message to the management server SV1 via the base station BS1. A message similar to the message of FIG. 8 may be sent to a supervisor of the connection candidate and the subject to be improved in order to ask the supervisor to write a message as well. FIG. 8 illustrates an example in which the sensor node kept by Mr./Ms. Wakamatsu who is a subject to be improved displays information which includes a notification that a communication has been achieved between Mr./Ms. Kimura and Mr./Ms. Kita and a prompt to decide whether to send a thank-you message to Mr./Ms. Kimura and Mr./Ms. Kita.

The management server SV1 refers to the database SD1 to identify a sensor device that is a destination of a message transmitted from the subject to be improved, or from the supervisor of the subject to be improved, and transmits the message to the identified sensor device. The sensor device that is the recipient of this message displays on its display screen a message, an example of which is illustrated in FIG. 9. In FIG. 9, the sensor device of Mr./Ms. Kita who is one of the connection candidates displays that a communication with Mr./Ms. Kimura has been achieved and that messages have arrived from Mr./Ms. Wakamatsu, who is a subject to be improved, and from Kita's supervisor.

Described next is an example of executing communication quality measurement when a suggested communication is actually held. If an encounter between persons intending to communicate with each other more is detected but is not a quality communication because, for example, they just happen to be in the same place at the same time and do nothing more in terms of communication with each other, treating this encounter as a communication could negate the original purpose of improving the productivity. This embodiment therefore uses sensor data to measure whether or not a productive discussion has been held.

An example of visualizing not only the amount of communication but also the quality of communication through quantification is described with reference to FIGS. 10 and 11. The measure of communication quality can be whether or not a lively conversation has actually been held, whether or not all participants have exchanged opinions, or the like. There is a conventional technology that uses audio data to specify the speech amount of each participant of a conference and to analyze the order relation of conversations and the conversation ratios of the participants. Described here is a method of obtaining the same indices from face-to-face data and acceleration data.

Behaving actively during conversation promotes the collection of inside/outside information and an idea is polished through heated discussions. Examples of actions expected in such situations include "using gestures in addition to words in a face-to-face conversation" and "speaking to the other person at a close distance". In this embodiment, the activeness of a conversation is measured by focusing attention on the fact that the body's motion increases while a person having a quality communication is speaking, and the fact that a listener of a speech, too, exhibits changes in nodding amount and the like in a manner that reflects his/her degree of interest.

Figure 10:
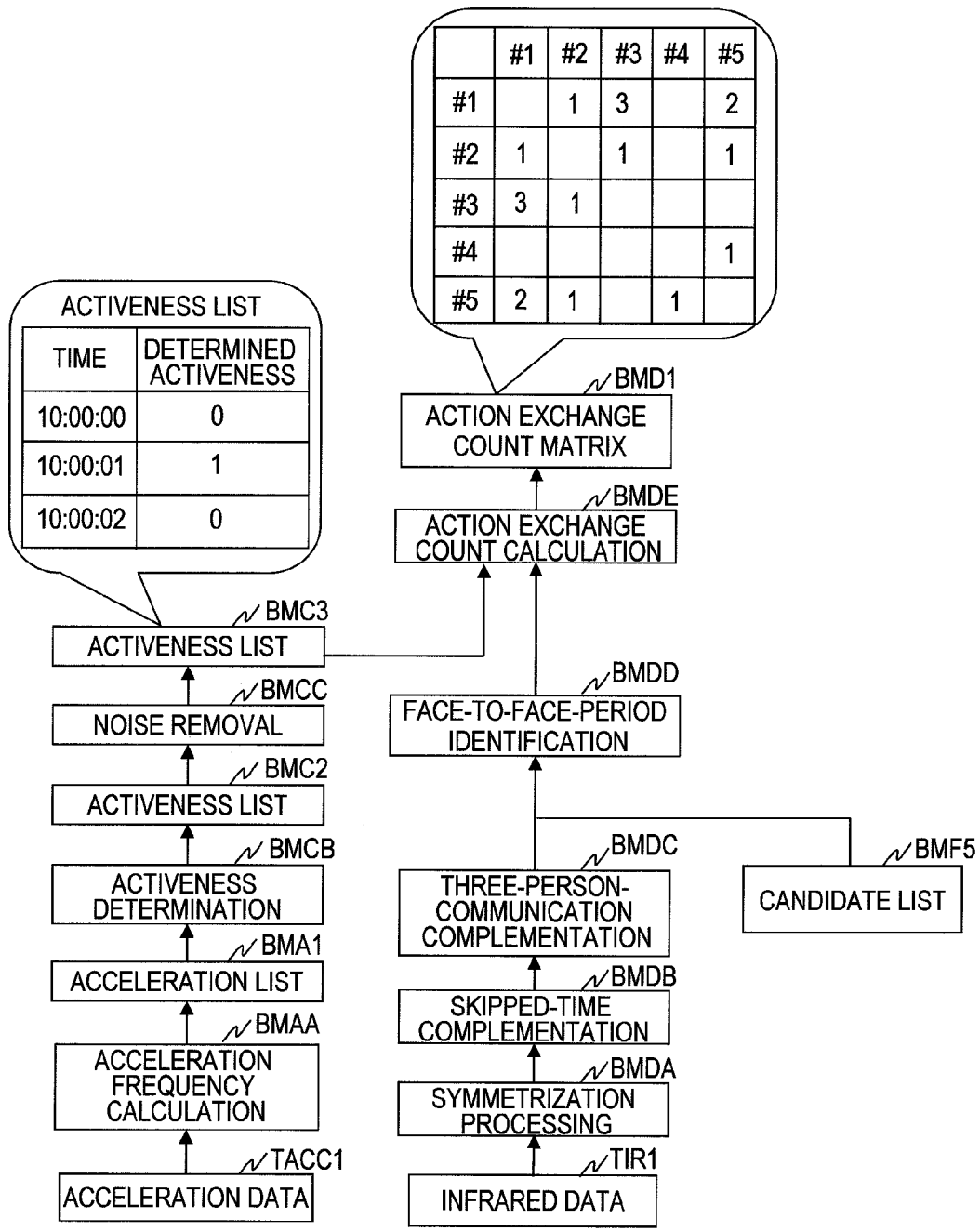
FIG. 10 is a flow chart of an example of determining activeness and calculating an action exchange count according to the second embodiment of this invention.

FIG. 10 illustrates the flow of determining for each time point whether or not a worker is active, identifying a conversation period from infrared data, and calculating from changes in activeness within this time period an action exchange count, which corresponds to the number of times a conversation is exchanged.

First, the activeness of a worker is obtained for each time period. From the results of a research conducted by the inventors of this invention with the use of video observation, it has been found that the acceleration frequency is higher in a time period where a person is engaged in an active work than other time periods. During a conversation, for example, a frequency component of 2 Hz to 3 Hz is high. A time period in which the acceleration frequency exceeds a certain threshold is therefore determined as an active state. Typically, a state where the acceleration frequency is 2 Hz or higher is an active state. This value varies depending on the individual and on the type of business operation and, accordingly, can be changed to settings that suit the situation.

Acceleration frequency calculation processing BMAA which is executed first is processing of calculating the frequency from the acceleration data TACC1 sorted in time series. The frequency is defined as the number of wave oscillations in one second, in other words, an index of the intensity of the oscillation. While the frequency may be calculated by Fourier transform, this application example uses the zero cross value as an equivalent to the frequency in order to simplify calculation. This lightens the processing load of the server and keeps an increase in the number of sensor nodes from increasing the calculation amount of the server.

The zero cross value is obtained by counting the number of times the value of time-series data reaches zero within a given period, more exactly, the number of times time-series data changes from a positive value to a negative value or from a negative value to a positive value. For example, if a period between the time when the acceleration value changes from a positive value to a negative value and the time when the acceleration value next changes from a positive value to a negative value is deemed as one cycle, the number of oscillations per second can be calculated by counting the zero cross count. The number of oscillations per second calculated in this manner can be used as the approximate frequency of the acceleration.

The sensor node SN0 of this application example has a triaxial acceleration sensor, and adds up triaxial zero cross values of the same period to obtain a single zero cross value. This can be used as an index of the intensity of oscillation particularly for fine pendular motions detected in the left-right direction and the forward-backward direction.

A value larger than the interval between consecutive pieces of data (i.e., the original sensing interval) is set as the "given period" in which the zero cross value is counted. For example, the per-second zero cross value or the per-minute zero cross value is obtained. As a result of the acceleration frequency calculation processing BMAA, the zero cross value in each time period and the number of oscillations per second calculated from the zero cross value are stored in a memory as an acceleration list BMA1, or generated as a file.

Next, activeness determination BMCB is performed on items on the list BMA1. As described above, whether a worker is active or not is determined here by whether or not the acceleration exceeds a certain threshold. Items on the list BMA1 are scanned in order and a value "1" indicating an active state is put in a determined activeness field of a row where the acceleration exceeds the threshold, whereas "0" indicating an inactive state is put in a determined activeness field of a row where the acceleration is smaller than the threshold. An activeness list BMC2 which shows whether a worker is active or not for each second-basis time period is generated as a result.

There are a case where the acceleration is smaller than the threshold at an instant but is larger (active state) than the threshold in time periods preceding and following the instant, and an inverse case where the acceleration is larger than the threshold at one instant but is smaller (inactive state) than the threshold in time periods preceding and following the instant. A function of removing this instantaneous noise is necessary.

Therefore, noise removal processing BMCC is performed next on the items of the list BMC2. The role of the noise removal is to remove an instantaneous change from time-series changes in activeness obtained above, for example, a sequence "0001000111111001111", by placing the instantaneous change in a context, and to thereby generate, for example, a sequence "0000000111111111111". Through this noise removal processing, the activeness is calculated taking into account the preceding and following time periods, and the obtained activeness reflects the actual circumstance more accurately. The noise can also be removed by removing high-frequency components with a low pass filter, but a majority decision method is described here as a simpler method. In this method, every time period from the first to the last in the time-series order is the subject of the determination. The current determination subject is the i-th time period.

The number of active states and the number of inactive states are counted for 2n+1 time periods in total from the (i−n)-th time period to the (i+n)-th time period. If the number of active states is larger than the number of inactive states and the i-th time period is not an active period, the i-th state is changed to an active state. On the other hand, if the number of inactive states is larger than the number of active states, the i-th state is set to an inactive state. For example, when n equals 2 and this method is applied to a sequence "0001000111111001111", a sequence generated as a result is "0000000111111111111". Only noise that is a short-span change is removed when n is small, and noise that is a long-span change is removed when n is large. How large or small a value is to be set as n varies depending on the individual and on the type of business operation. Alternatively, n may be set first to a small value to remove minute noise and then to a large value to remove noise that has a longer span. Executing this majority decision method reduces the calculation amount of the server and lightens the server's processing load. An activeness list BMC3 which shows whether a worker is active or not for each second-basis time period is generated as a result. From this activeness list, the length of time in which a worker has been active (active period) is obtained for each worker and, by comparing this against the length of time in which the worker has communicated, the active period of the worker during a conversation can be obtained.

Next, the length of time in which the workers in question have held a communication is specified from the infrared data TIR1 and the candidate list BMF5 in a manner described below. The infrared data TIR1 contains information indicating when and with whom a worker has had a face-to-face encounter, and the communication period may be determined from this information. However, when a name tag-type sensor is employed, data does not match reality in some circumstances, and it is therefore necessary to improve the precision of data first as pre-processing.

Firstly, data symmetrization processing BMDA is performed. When workers A and B face each other, the sensor device of the worker B may fail to receive infrared rays from A due to the directions of the sensor devices and the angle of ambient light, while the sensor device of A receives infrared rays from B. The symmetrization processing is for correcting data in such situations. Specifically, the sensor data TIR1 is scanned in order and, in the case where the sensor device of the worker A has received infrared rays of B at some time point, it is determined that the sensor device of the worker B has received infrared rays of A at the same time point and data is added to the sensor data TIR1.

Secondly, data is complemented for a skipped time. Envisioned in this step is a situation where, while the workers A and B are facing each other, one of the workers temporarily shifts his/her body and consequently fails to receive infrared data during that period. Specifically, the face-to-face encounter between the workers is expressed by time-series data as in the noise removal BMCC described above, data missed in the short period is supplied for complementation, and the complementing data is added to the sensor data TIR1. The same technique can be used to remove infrared data that is detected when workers just briefly passed each other without communicating.

Thirdly, three-person, face-to-face communication complementation BMDC is performed. Envisioned in this step is a situation where, when three or more workers are communicating, infrared rays are not detected between, for example, the workers B and C while the workers A and B receive infrared rays of each other and the workers A and C receive infrared rays of each other. Such situations arise due to the directions of workers' bodies or the ways the workers sit. As a countermeasure, every combination of three persons out of all workers is checked and, in the case where infrared rays have been detected between a first worker and a second worker and between the first worker and a third worker, it is determined that the second worker and the third worker have been face-to-face with each other at the same time point as the detection, and face-to-face data is added to the infrared data TIR1. Repeating the symmetrization processing, skipped-time complementation, and three-person-communication complementation described above a number of times enhances the precision.

After executing the pre-processing for improving the precision, the candidate list BMF5 is referred to in order to identify connection candidates, and the start time and end time of a communication between the connection candidate are identified (BMDD).

Next, action exchange count calculation BMDE is performed to calculate the action exchange count in the identified communication period. This processing is for estimating how many times a conversation is exchanged within the communication period from changes on the activeness lists of the subjects. For example, in the case where changes "11011" are on the activeness list of the worker A and changes "00110" are on the activeness list of the worker B, the action exchange count is calculated by estimating, for each time point on the lists, which of the workers is speaking and then counting the number of times the speaker is switched.

In this example, when time points associated with the respective values "11011" of the activeness list of the worker A are given as times 1 to 5, the worker A is active and the worker B is inactive at the time 1. It is determined in this case that the worker A is speaking. The situation is the same at the time 2. Therefore, it is determined that the worker A is continuing to speak and the action exchange count remains 0. At the time 3, it is determined that the speaker is now B, and the switching of the speaker at the time 3 makes the action exchange count 1. At the time 4, both workers are in an active state and it is likely that the two are speaking at the same time. In such cases, it is determined, for example, that the speaker has not been switched. At the time 5, the speaker switches to A and the action exchange count is accordingly increased to 2. The final action exchange count in this conversation is 2, and the per-unit time exchange count calculated by dividing the final count by the total time, 5, is 2/5.

The processing described above is performed for every communication on the candidate list to obtain an action exchange count matrix BMD1, which indicates for every two persons how often the speaker has been switched between the two. In this matrix, a numerical value in a cell where a row i and a column j meet is the estimated number of times the speaker has been switched.

Figure 11:
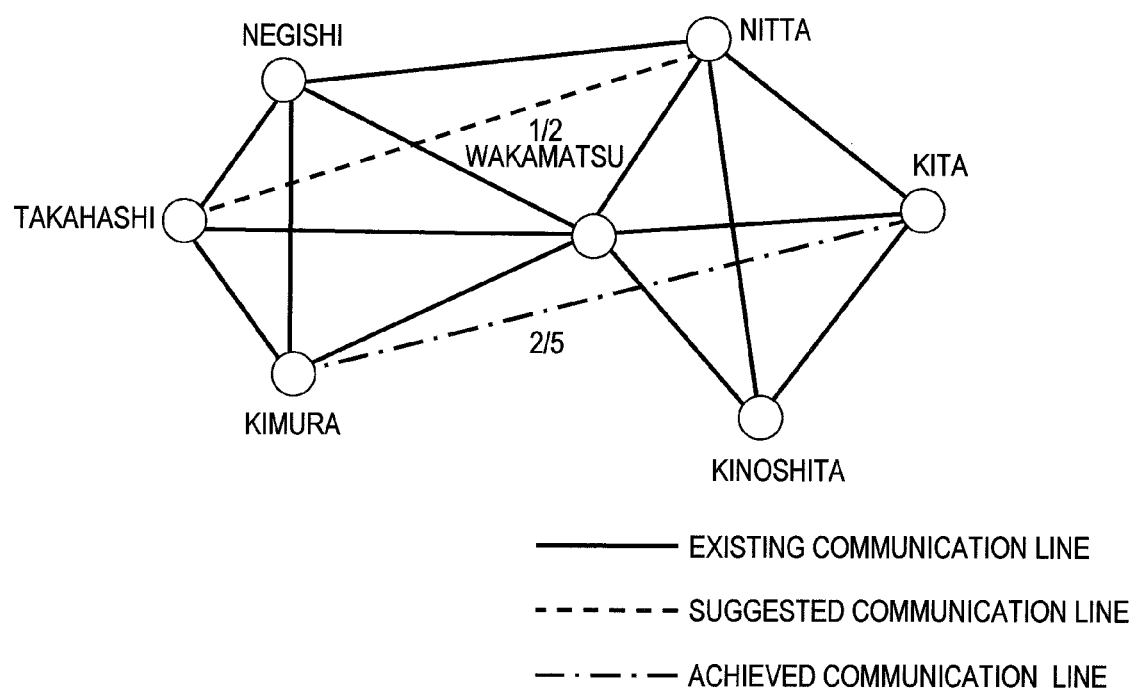
FIG. 11 is a diagram illustrating an example of a screen that displays the quality of communications according to the second embodiment of this invention.

FIG. 11 illustrates an example of visualizing the measured communication quality. Here, the per-unit time exchange count obtained by the action exchange count calculation of FIG. 10 is displayed as attributes of a suggested communication line and an achieved communication line. The exchange count information can be expressed by the thickness of the line and the line type. The per-unit time activeness of a worker which is obtained from the activeness list may also be expressed as attributes of a suggested communication line and an achieved communication line. FIG. 11 shows that Mr./Ms. Kita and Mr./Ms. Kimura have faced each other for a total time of 5 during which the action exchange count has reached 2. FIG. 11 also shows that Mr./Ms. Nitta and Mr./Ms. Takahashi have faced each other for a total time of 2 during which the action exchange count has reached 1.

In this manner, calculating the activeness of workers and the action exchange count as indices of communication quality and then displaying the calculated communication quality along with a suggested communication as attributes of the suggested communication makes it possible to grasp whether a communication held between persons intending to communicate with each other more has been a quality communication.

As described above, data detected in a face-to-face encounter that lasts as long as a predetermined threshold (for example, five minutes), or longer, may be treated as valid face-to-face data. In other words, it may be determined that a face-to-face encounter that does not last a given length of time is not an established communication. In the example of FIG. 11, Mr./Ms. Nitta and Mr./Ms. Takahashi have not made a sufficient face-to-face communication yet and the displayed line between the two therefore remains a suggested communication line.

Third Embodiment

Figure 12:
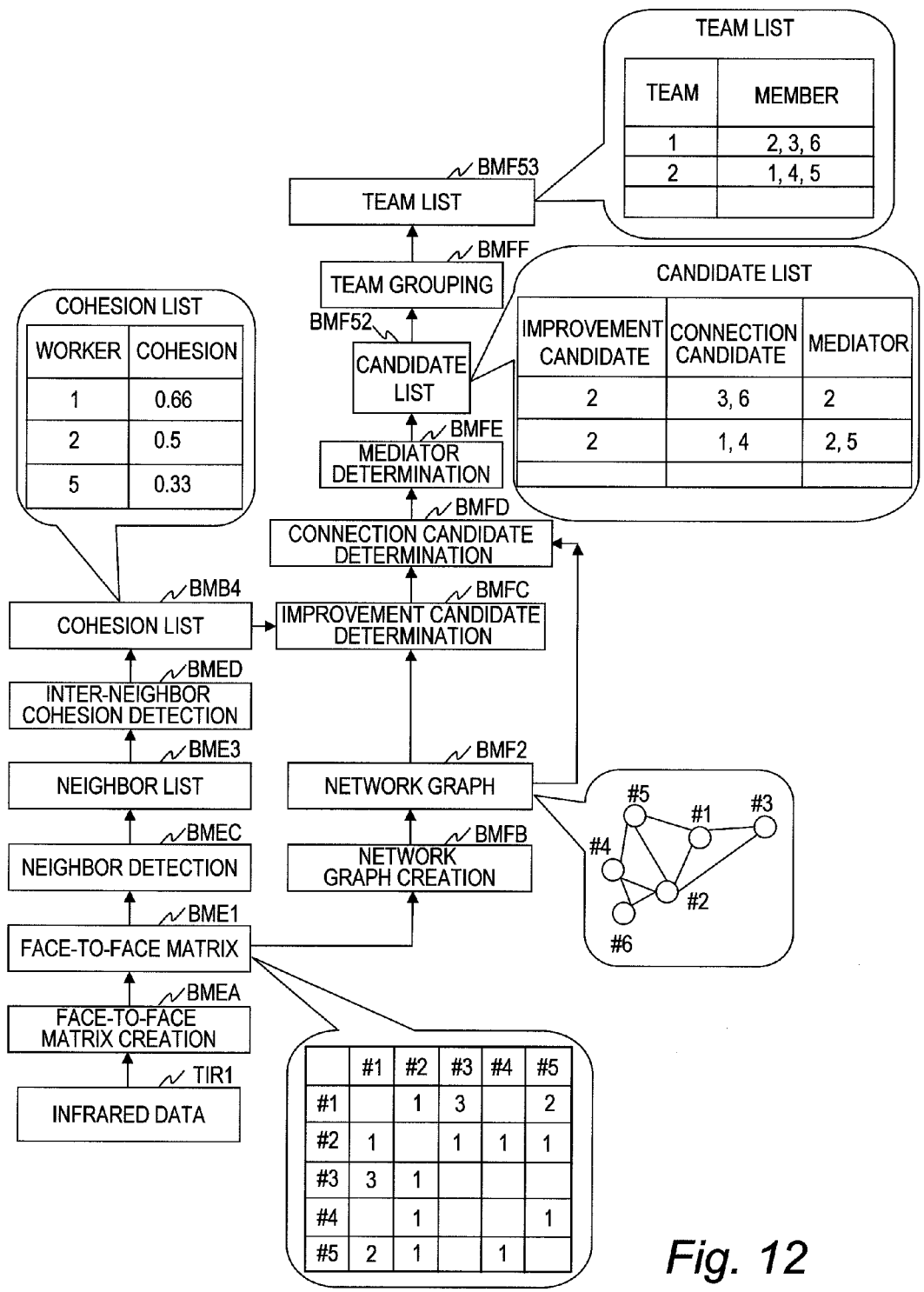
FIG. 12 is a flow chart of an example of assigning a mediator and team members according to a third embodiment of this invention.

FIG. 12 is a diagram illustrating an example of a communication promoting method according to a third embodiment of this invention in which two persons who are desired to communicate more with each other are joined by another worker.

For example, when a suggestion is made in FIG. 11 to Mr./Ms. Nitta and Mr./Ms. Takahashi that they should communicate more with each other, finding a common topic takes time if they do not know each other's background and specialty, and they may consequently be unable to have more than a fleeting conversation. It is also a common notion that a manager who manages the two should take on the role of leading a communication between the two. This embodiment has therefore a feature of identifying a common acquaintance of two persons based on the actually measured network structure, grouping together the three including the acquaintance, and suggesting that the common acquaintance should lead a conversation between the two. In other words, roles in a communication are determined based on information that is obtained with a sensor device, instead of the organization's existing information such as the post in the organization. This way, drawing out a common topic is facilitated and sharing the mind in a limited amount of time is promoted.

In this embodiment, a person who has had a given amount of face-to-face communication with both workers is determined as a common acquaintance. "Common acquaintance" means a person who is connected directly to both workers on the network. For instance, in FIG. 11, Mr./Ms. Negishi and Mr./Ms. Wakamatsu are easily identified as common acquaintances of Mr./Ms. Nitta and Mr./Ms. Takahashi. Accordingly, a communication among the three or the four, i.e., Mr./Ms. Nitta and Mr./Ms. Takahashi plus one or both of Mr./Ms. Negishi and Mr./Ms. Wakamatsu, is suggested to the workers.

Specifically, in FIG. 12, connection candidates are determined in the same manner as in FIG. 3 and then mediator determination BMFE is conducted. A mediator is a worker who can be reached from every connection candidate and is identified from the face-to-face matrix BME1. For example, a mediator who can directly mediate between the worker 3 and the worker 6 in the network graph of FIG. 12 is the worker 2. The worker 2 and the worker 5 can directly mediate between the worker 1 and the worker 4. A candidate list BMF52 is created through the mediator determination processing BMFE.

Next, based on the created candidate list BMF52, team grouping processing BMFF is executed to create teams in each of which team members communicate with one another. The purpose of this step is to allocate members such that connection candidates and their mediator are included in one team by referring to the candidate list. Teams may be created simply by grouping together persons who constitute the same item on the candidate list. However, this method allows the same person to belong to a plurality of teams and creates a heavy burden on a person belonging to multiple teams. A more effective way is to create as many teams as possible while allowing each person to belong to only one team. Various combinatorial optimization algorithms are applicable to this team allocation. In one possible method, workers are first allocated at random, the current members are switched at random, and if connection candidates and their mediator fall in one team as a result, the connection candidates and their mediator are fixed as members of the team. Applying this method to team allocation in the example of FIG. 12 produces a first team constituted of the workers 2, 3, and 6 and a second team constituted of the workers 1, 4, and 5.

Figure 13:
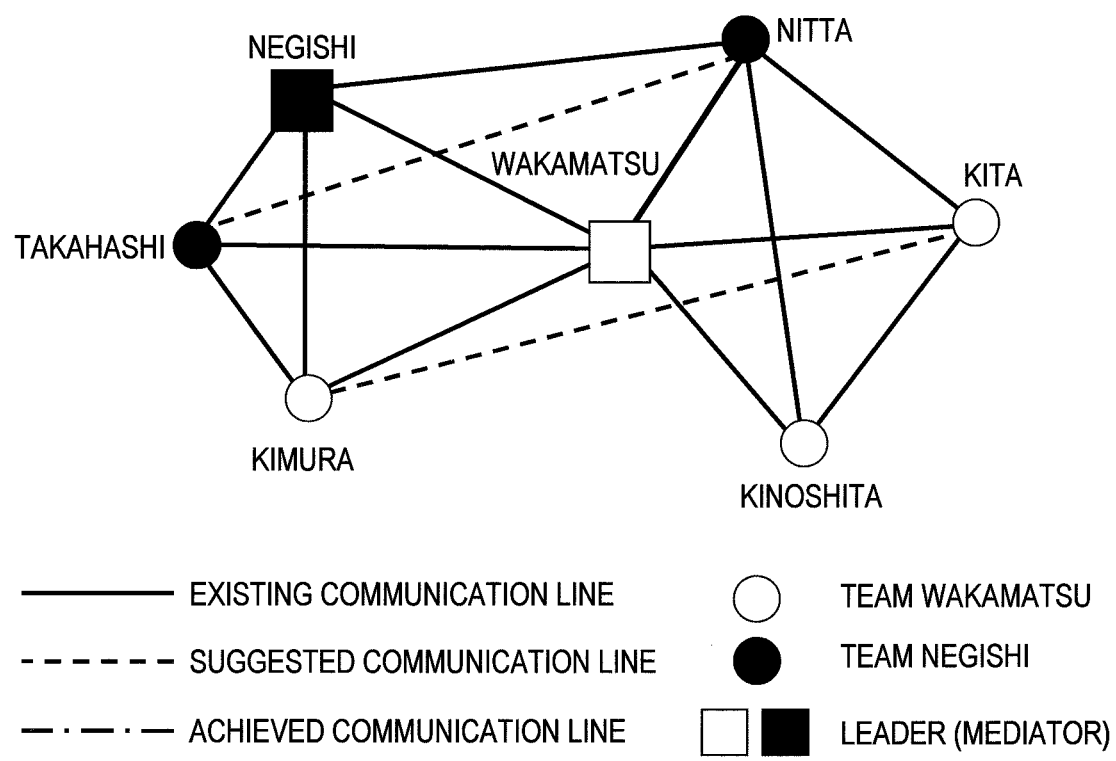
FIG. 13 is a diagram illustrating an example of a screen that displays the assignment of a mediator and team members according to the third embodiment of this invention.

Next, an example is given on how a communication that involves the mediator obtained in FIG. 12 is suggested. As illustrated in FIG. 5, the names of all team members may be notified to the device of each team member. FIG. 13 is a graphical representation of this method. As an example, when a calculation by the method of FIG. 12 determines Mr./Ms. Wakamatsu as a first subject to be improved, determines Mr./Ms. Kita and Mr./Ms. Kimura as connection candidates, and selects Mr./Ms. Wakamatsu as a mediator as well, Mr./Ms. Wakamatsu, Mr./Ms. Kita, and Mr./Ms. Kimura are displayed in the same color in order to make a suggestion in which the three belong to one team, and Mr./Ms. Wakamatsu who is a mediator is displayed in a manner that distinguishes him/her as a leader. In FIG. 13, for example, square marks are displayed only for leaders. In the case of a second set of candidates on the candidate list where the subject to be improved is again Mr./Ms. Wakamatsu, the connection candidates are Mr./Ms. Takahashi and Mr./Ms. Nitta, and Mr./Ms. Wakamatsu and Mr./Ms. Negishi are mediators, there are two possible team grouping methods. The first method is to select Mr./Ms. Wakamatsu as the leader of a team to which Mr./Ms. Takahashi and Mr./Ms. Nitta belong. The second method is to select Mr./Ms. Negishi as the leader of a team to which Mr./Ms. Takahashi and Mr./Ms. Nitta belong. Here, the policy that does not allow one person to belong to a plurality of teams is employed, the plan that sets Mr./Ms. Negishi as the leader is selected, and the three members are displayed in a color (painted solid with black in the drawing) different from that of the first team. Mr./Ms. Kinoshita who is selected for neither of the above-mentioned two teams may be joined to one of the teams at random or may be kept from belonging to either of the teams. Here, the random joining method is employed to join Mr./Ms. Kinoshita to Team Wakamatsu. Seeing this graph, workers who are users and a manager who manages the workers can each understand at a glance which worker belongs to which team, which people are in the same group as himself/herself, his/her role in the team, and the like.

In this manner, in addition to extracting persons who should have a communication with each other from the network structure, a mediator who mediates the communication is determined and teams are grouped including the mediator. Information prompting a communication is then displayed for the team that includes the mediator. The persons who should communicate with each other are thus expected to be able to share their backgrounds and interests in a short period of time, and the efforts to increase triangle structures and improve the organization's productivity are expected to advance.

Figure 24:
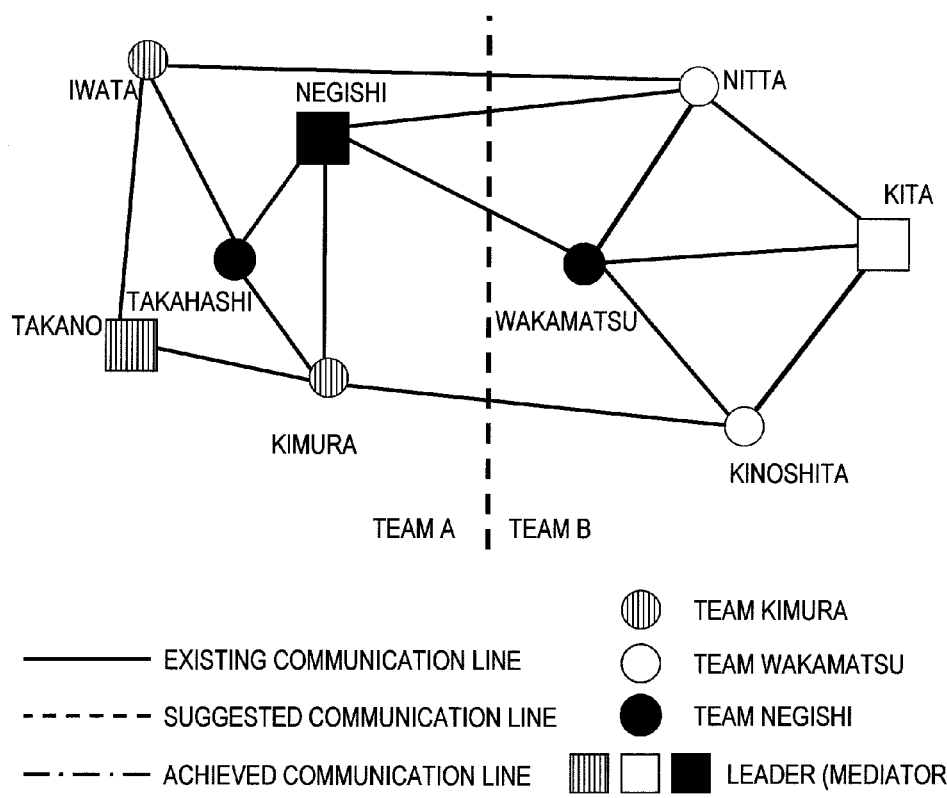
FIG. 24 is a diagram illustrating an example of team allocation for a plurality of departments according to the third embodiment of this invention.

Further, the method of FIG. 12 can be expanded for allocation across a plurality of departments. For example, FIG. 24 illustrates a case where there are two teams, A and B, and the team A has five members whereas the team B has four members. Applying the method of FIG. 12 to this network may produce a new triangle in the same team and may produce a triangle that stretches across the teams. When triangles are increased within a team, the expertise and productivity of the division are improved. On the other hand, a new business or product is often born at the boundary between teams, and it is also significant to increase triangles between divisions. A method that balances these two is needed. However, with the method of FIG. 12, which of the two types of triangles is formed cannot be controlled and, in some cases, triangles are formed only within a team or only between teams.

Figure 25:
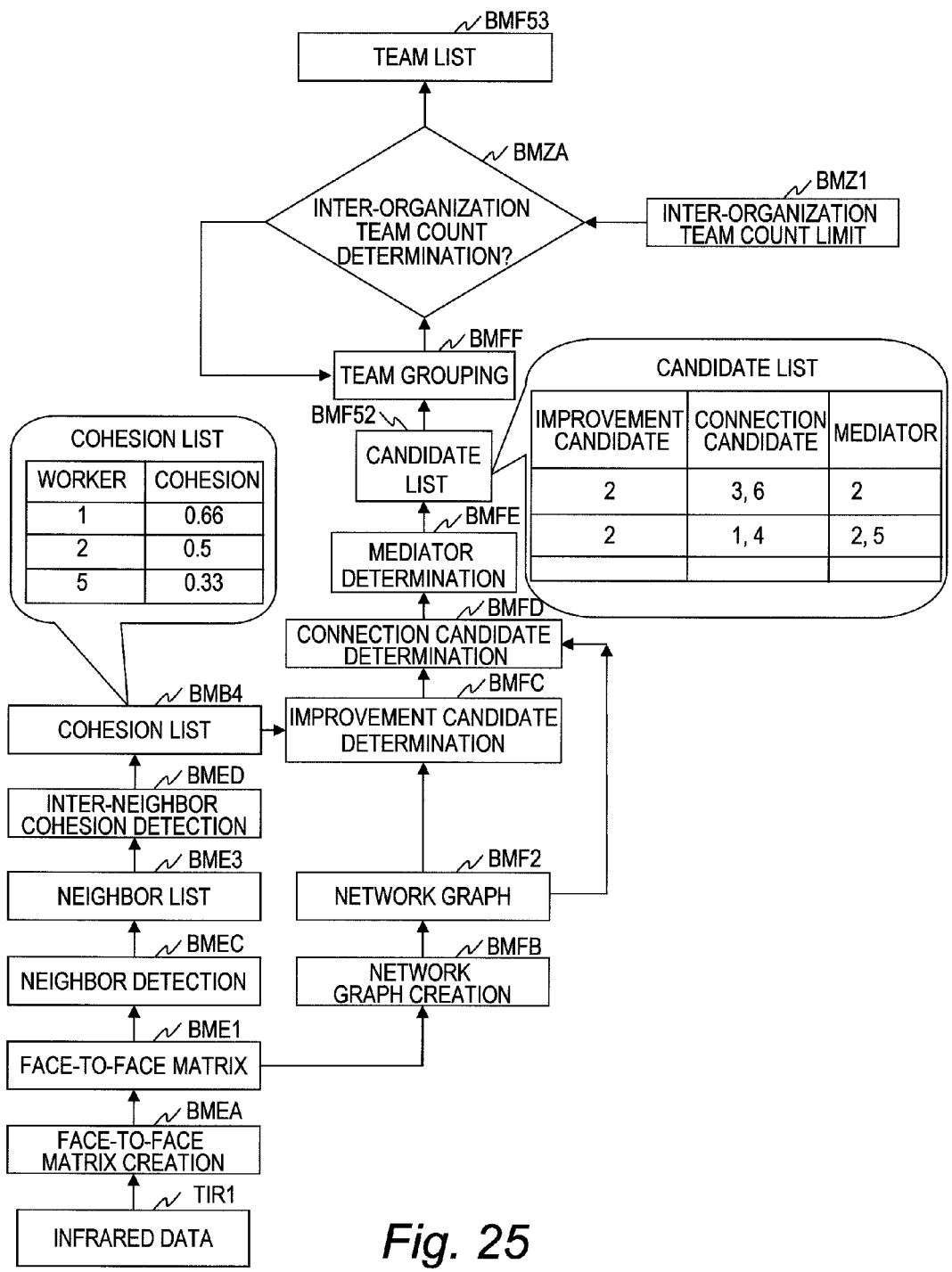
FIG. 25 is a flow chart illustrating an example of determining an inter-organization team count according to the third embodiment of this invention.

In FIG. 25, in contrast, the management server holds an inter-organization team count limit BMZ1, and whether or not the number of allocated teams exceeds an upper limit is determined through inter-organization team count determination processing BMZA. If the number of allocated team exceeds the upper limit, the current team grouping is discarded and different team grouping is repeated for a given number of times. This avoids creating teams only within one organization or only between organizations, except when there is no solution, and balances the number of teams within an organization and the number of teams that stretch across organizations. In other words, both the improvement of productivity within one organization and the improvement of productivity through cooperation between organizations are expected to be accomplished.

For example, in FIG. 24, the inter-organization team count limit BMZ1 is assumed as 1 and, through the first round of team grouping processing BMFF, Mr./Ms. Iwata, Mr./Ms. Nitta, and Mr./Ms. Kita are assigned to the team A, Mr./Ms. Negishi, Mr./Ms. Wakamatsu, and Mr./Ms. Kinoshita are assigned to the team B, and the rest are assigned to a team C. In this case, the teams A and B stretch across organizations and the number of inter-organization teams is 2, which exceeds the inter-organization team count limit BMZ1. Accordingly, this allocation is discarded and a different combination is tried to arrive at allocation as the one illustrated in FIG. 24. In an alternative method, inter-organization teams alone are determined until the inter-organization team count limit is reached, and then teams are allocated within each organization.

Figure 18:
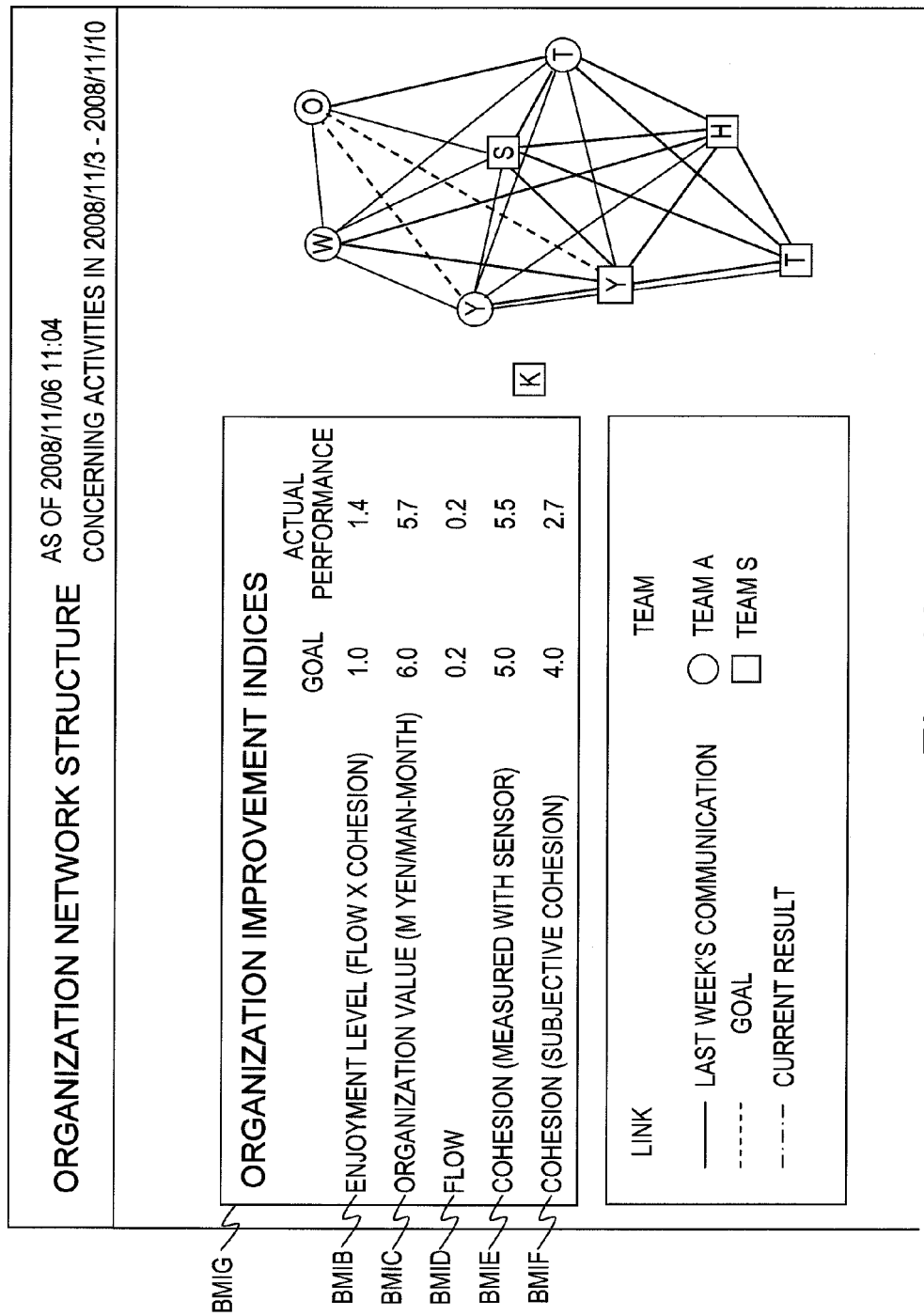
FIG. 18 is a diagram illustrating an example of a screen that displays actual performance and prediction of communications according to the third embodiment of this invention.
Figure 19:
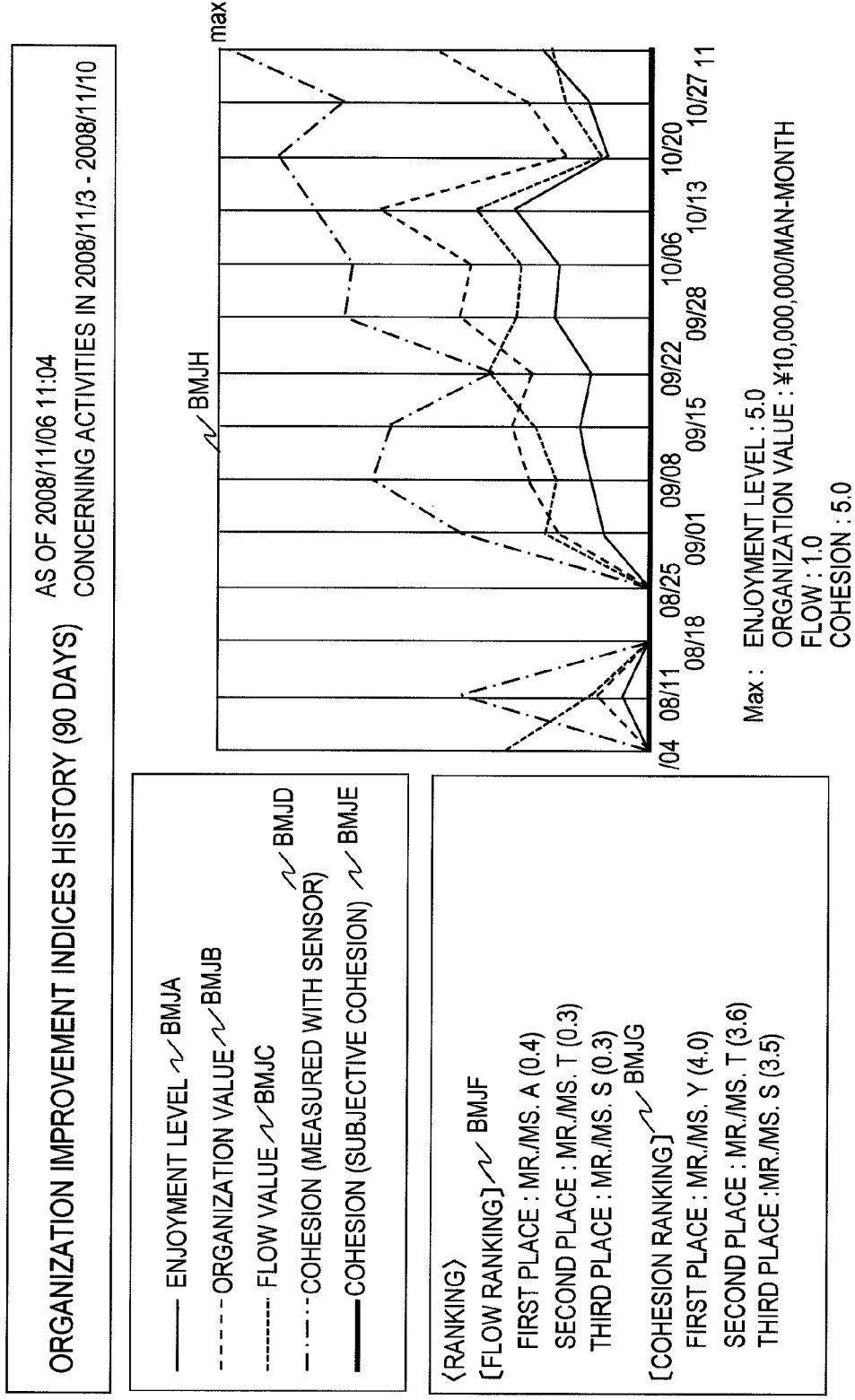
FIG. 19 is a diagram illustrating an example of a screen that displays changes in organization indices according to the third embodiment of this invention.

FIG. 18 is an example of displaying a network structure and additionally displaying attendant information as organization improvement indices BMIG. FIG. 19 is an example of displaying time-series changes BMJH of the indices illustrated in FIG. 18. An index displaying field of FIG. 18 displays objective and actual values of indices. An objective value can be a value arbitrarily determined by the organization, or an average value obtained from measurement results of various organizations. The displayed indices include BMID and BMIE which are, for example, an index of the degree of absorption of each individual which is calculated by a method illustrated in FIGS. 20 and 21 and is called the flow level, and the actually measured value of an index that indicates the amount of triangles of the organization, respectively. "Flow" is, in psychology, a state where a person is exerting his/her skill on a difficult task, i.e., a favorable state that is expected to improve the person's view on the worthwhileness of his/her task and the person's productivity. A method of estimating the flow level of a worker involves questionnairing the worker about the difficulty level and the exerted skill level at an instant and determining the instant as a flow state if the two are both high. The estimated value of the flow level can be obtained from sensor values by the method of FIGS. 20 and 21.

Figure 20:
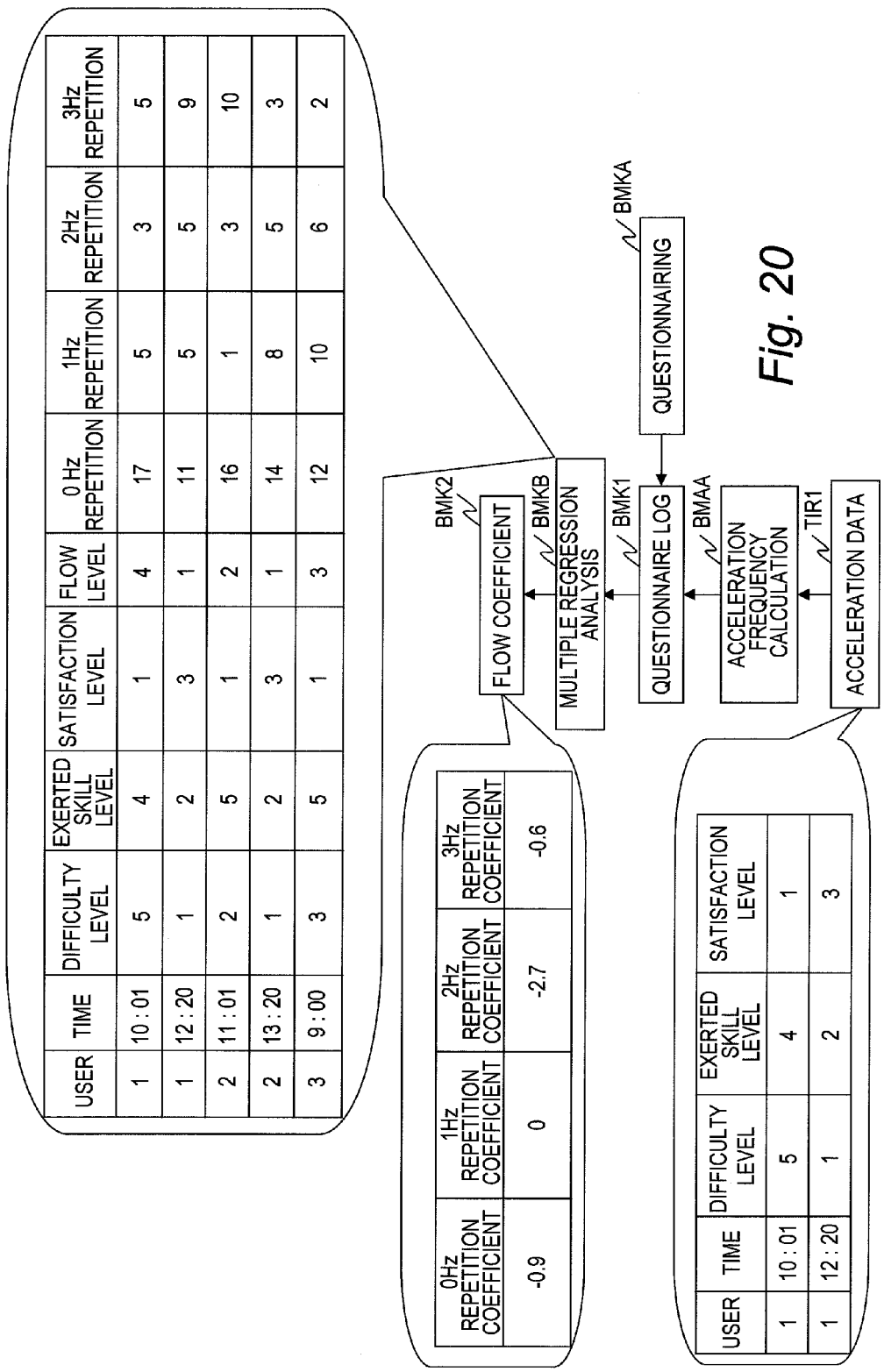
FIG. 20 is a flow chart of an example of learning actions in a flow state according to the third embodiment of this invention.

Before the system is actually run, processing described below with reference to FIG. 20 is performed first as pre-processing to learn what action (i.e., frequency) is dominant when flow occurs often. First, each worker works wearing the sensor node SN0. During the work, questionnairing processing BMKA is performed irregularly. Questionnaire answering time and sensor data are synchronized precisely with each other by irregularly inputting a signal from the sensor node SN0. For example, the sensor node irregularly sounds a beep and the worker gives the state at the instant the beep is sounded as an answer. What time a beep has been sounded is recorded in data obtained from the sensor node SN0, thereby enabling the server to synchronize the questionnairing and data.

In FIG. 20, in the acceleration frequency calculation processing BMAA, for each frequency, how often data of the frequency appears around a questionnaire answering time is calculated, and the calculated appearance repetition of the frequency is stored in a questionnaire log BMK1 along with the questionnaire answer. For example, data in the first row of a table of FIG. 20 is data given by a user 1 at 10:01 as an answer, which is "difficulty level: 5, exerted skill level: 4". In this embodiment, the smaller value of the difficulty level and the exerted skill level is determined as the flow level. Next, the appearance repetition of each frequency is calculated from data around that time. Specifically, data in a period starting fifteen minutes before the beep and ending fifteen minutes after the beep, thirty minutes in total, is used to calculate the acceleration frequency for each one minute. Seventeen pieces of data that corresponds to 0 Hz, namely, seventeen minutes of data, are found as a result. This is performed for every piece of data of every worker to estimate statistically which acceleration frequency is dominant when the flow level is high. In this embodiment, for example, multiple regression analysis processing BMKB is performed with the flow level as a response variable and the calculated repetition of each frequency as an explanatory variable. As a result, flow coefficients BMK2 which are a compilation of weights for the repetitions of the respective frequencies.

Figure 21:
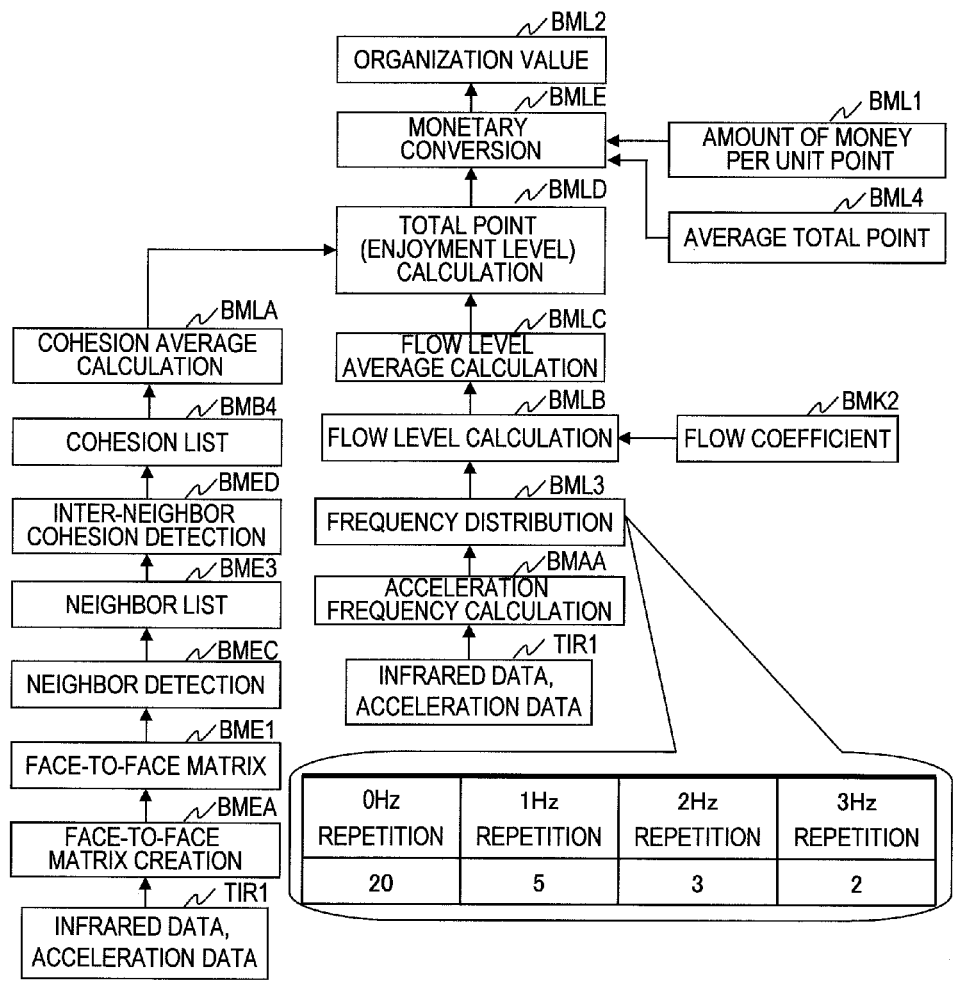
FIG. 21 is a flow chart of an example of calculating the cohesion state of an organization from cohesion and the flow state.

Data obtained through this pre-processing is used to calculate in real time the flow level at one time point by the method of FIG. 21. Specifically, the acceleration frequency calculation processing BMAA is executed for each worker to determine the frequency for every one minute in a period starting and ending fifteen minutes before and after a time point, thirty minutes in total, and to obtain a frequency distribution BML3. The obtained frequency distribution is, for example, as illustrated in FIG. 21, where 0 Hz appears twenty times, 1 Hz appears five times, 2 Hz appears three times, and 3 Hz appears twice. The flow level is calculated (BMLB) from this by multiplying the repetition of each frequency by the flow coefficient BMK2 that indicates the weight for the repetition of that frequency and then adding up the weighted values. Specifically, the flow level is calculated as $20\times(-0.9)+5\times0+3\times(-2.7)+2\times(-0.6)+30=2.7$. The last term in the expression, 30, is the residual obtained when the multiple regression analysis processing BMKB has been performed. The flow level is calculated by this method for every worker, and average calculation processing BMLC is performed on the calculated flow level values to obtain the average value of all workers. The result is displayed as actual flow BMID of FIG. 18 and flow changes BMJC of FIG. 19, thereby enabling people to grasp the present situation quickly and change work assignment and workload.

The values of the respective workers before the averaging may be used to display top-ranking persons in flow ranking BMJF and cohesion ranking BMJG, which is expected to have an effect of raising the awareness of each individual.

The flow level average and a cohesion average value obtained through cohesion average calculation processing BMLA for averaging the cohesion values of the respective workers are used to calculate a comprehensive result through total point calculation processing BMLD. It can be said that an organization higher in flow level and cohesion overall has a higher productivity. The total point calculation processing is specifically a simple multiplication of the two figures, for example. In this embodiment, this comprehensive index is called "enjoyment level" and the result is displayed as BMIB of FIG. 18 and BMJA of FIG. 19. Whether the whole organization has improved or deteriorated overall can thus be determined.

This comprehensive value may further be processed through monetary conversion processing BMLE to make people aware of the value of the organization more clearly. To use in the monetary conversion processing, the amount of money associated with an average total point is defined first and stored as BML1. The amount of money associated with a total point may be, for example, monthly personnel cost. Next, an average value of values obtained through the total point calculation processing BMLD is recorded as an average total point BML4. Next, the actual total point is divided by the average total point BML4, and the quotient is multiplied by the per-unit point money amount BML1 to obtain an organization value BML2. The result of obtaining the organization value BML2 is displayed in the manners of BMIC of FIG. 18 and BMJB of FIG. 19.

In FIG. 18 and FIG. 19, an average value of subjective evaluations obtained through questionnaires which are collected from participants as needed is further displayed as an actually measured value. For example, workers are questionnaired everyday about the overall level of team cooperation on that day and an average value of the cooperation levels is displayed as BMIF of FIG. 18 and BMJE of FIG. 19.

Fourth Embodiment

If teams are grouped only for the purpose of improving triangle structures without regard to business operations, the teams may not function when the business operations are busy. This embodiment has a feature that teams are grouped in relation to main business operations.

Figure 14:
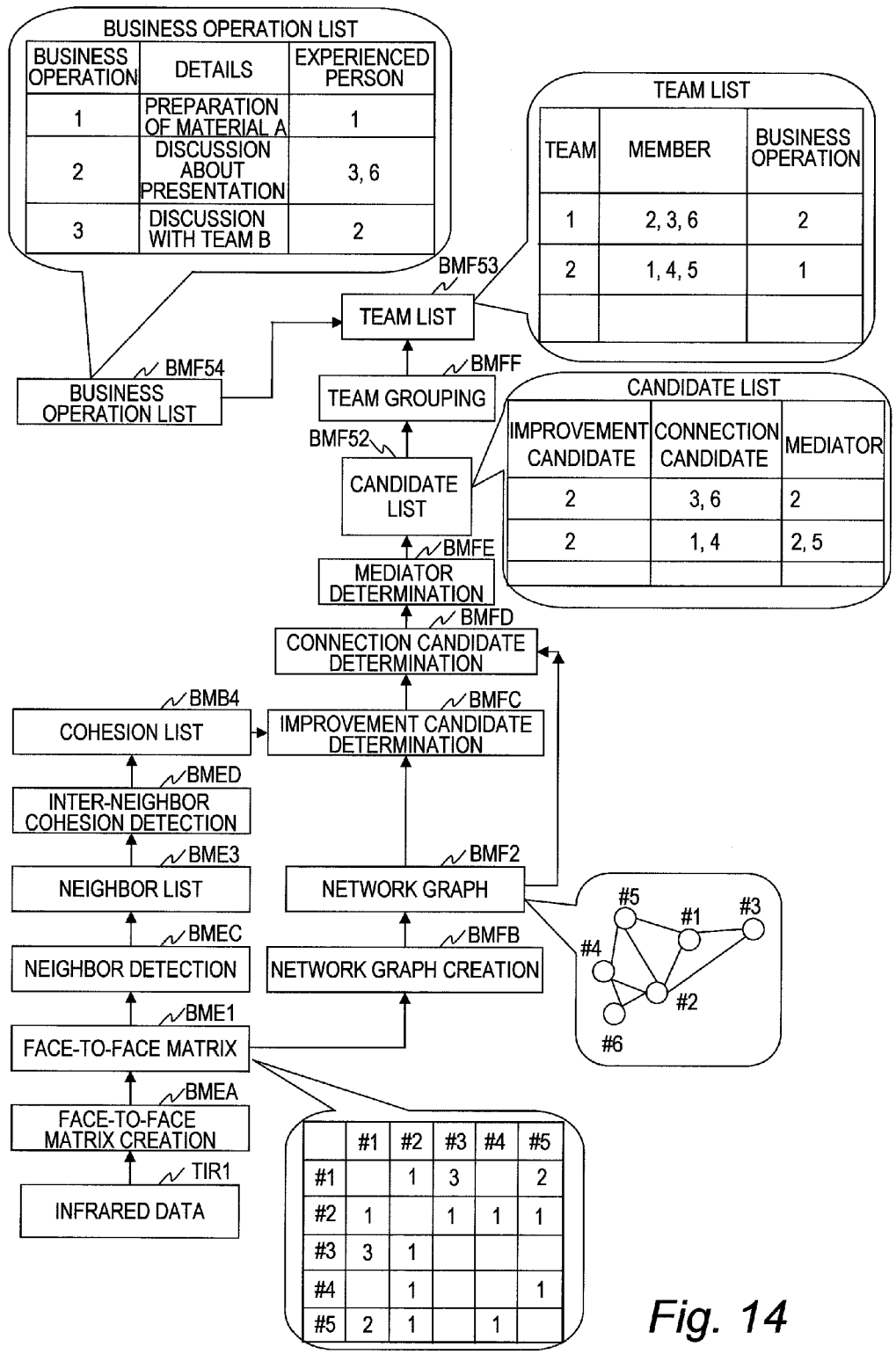
FIG. 14 is a flow chart of an example of allocating business operations according to a fourth embodiment of this invention.

FIG. 14 is a diagram illustrating an example of advancing business operations of an organization while increasing triangles on its network. The steps of FIG. 12 up through the team grouping processing BMFF are executed. Next, a business operation list BMF54 in which details of business operations to be performed in the organization are listed is referred to in order to assign business operations to the respective teams and store the assigned business operations in a team list BMF53. Business operations stored in the business operation list BMF54 are added as needed via a computer or the like from a manager or workers of a division to be stored in the database SD2 of the management server. Further, the business operation list stores information indicating persons who have experience in the respective business operations. For example, the business operation list BMF54 of FIG. 14 shows that the person who has experience in a business operation detail "preparation of a material A" is the worker 1.

Each team performs its assigned business operation for a given period of time, for example, for a week from the time of assignment. Assigning business operations in this manner allows the teams to communicate efficiently towards an increase in the number of triangles while carrying out the business operations. Items on the business operation list may be assigned to teams at random. Alternatively, who constitute the members of each team may be considered to preferentially assign a task that the members have performed in the past or, conversely, to assign a task that the members have not performed in the past. Business operation assignment based on the strong points of each worker may be exercised by classifying business operations into several types such as material preparation, negotiation, and presentation, recording for each worker which business operation type the worker is good at and which business operation type the worker is poor at, and using the data of each worker in assigning a business operation. For example, according to the business operation list, the workers 3 and 6 have an experience of discussing about a presentation, and a business operation 2 which is a discussion about a presentation is consequently assigned to a team 1 which includes the connection candidates 2, 3, and 6 in the team list BMF53 of FIG. 14.

This way, taking time to meet each other just to increase triangle structures is prevented and team grouping ingeniously linked with main business operations is accomplished. Business operations of an organization can thus be advanced while triangles are increased.

Fifth Embodiment

Figure 15A:
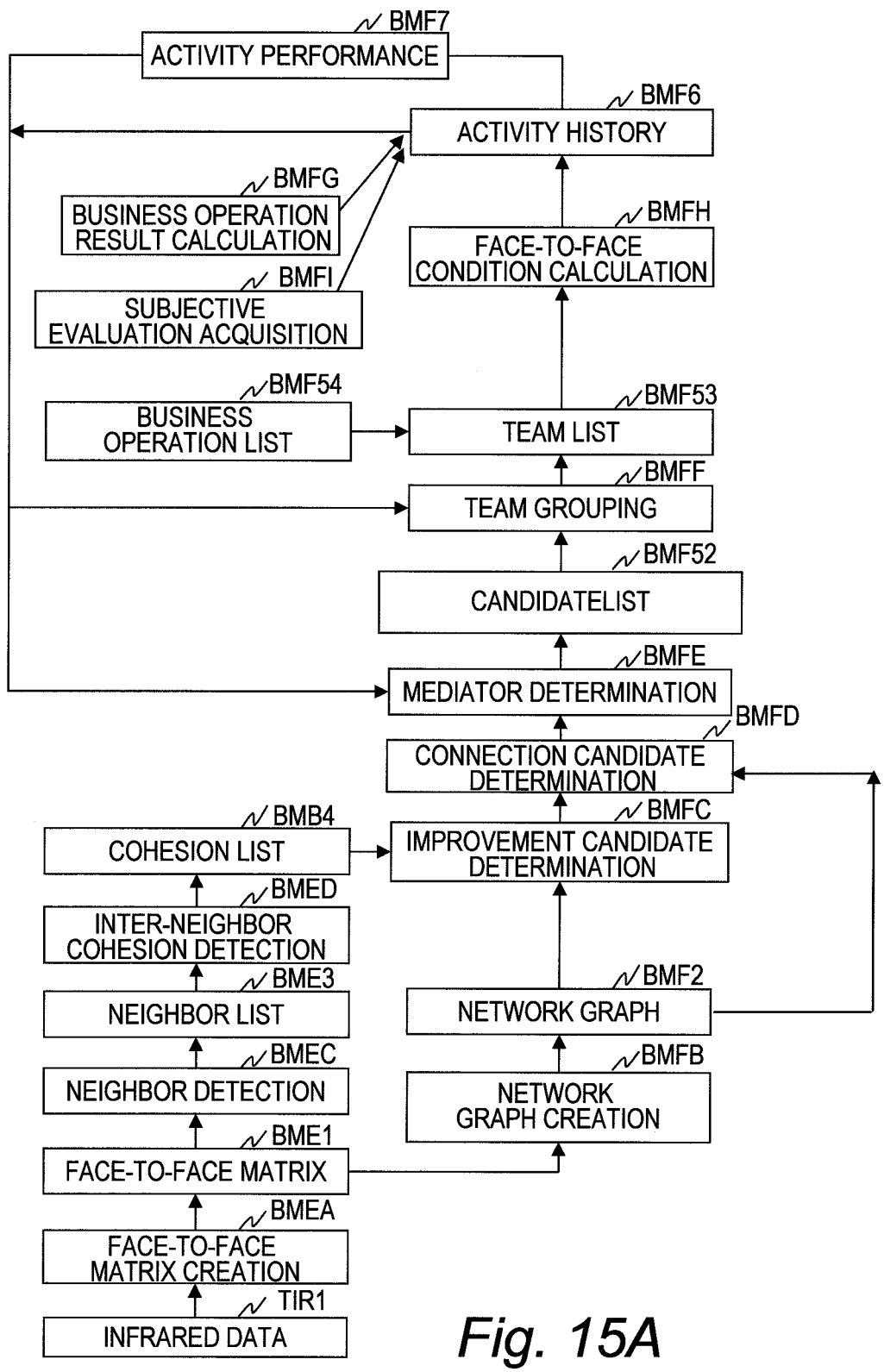
FIG. 15A is a flow chart of an example of storing an activity history and activity performance according to the fourth embodiment of this invention.

FIG. 15A is an example of improving the network condition by continuously using the method that has been described herein. Instead of just repeatedly applying the above described method, business operation results registered when the method has been carried out in the past, subjective evaluations of participants, conversation conditions collected from the sensor, and the like are reflected on team grouping and the determination of roles. This way, results of communication suggestions made in the past are reflected on future suggestions, and triangles can be increased continuously and efficiently.

In FIG. 15A, the steps of FIG. 14 up through the creation of the team list BMF53 are executed. Thereafter, business operations are started in accordance with the team list BMF53, and face-to-face condition calculation BMFH is performed. Here, sensor data is used to obtain the date/time of a face-to-face encounter and the measured period of the face-to-face encounter, and the calculated values are stored in rows of the respective teams in an activity history BMF6 (see FIG. 15B). Results of business operations assigned to the respective teams are obtained as numerical values through business operation result calculation BMFG and also stored in the activity history BMF6. What result is obtained varies from one business operation to another. For example, in the case of a sales task and the like, sales data may be obtained directly from the system of the business operation. If there is no quantified data, a manager or all workers rate the state of the team everyday on a scale of, for example, one to five on the worker-use input PC1 or on the sheet ES1, and the rating result is stored.

Next, in subjective evaluation acquisition BMFI, members allocated to a team provide subjective levels of satisfaction about the activity of the team on a scale of one to five on the worker-use input PC1 or the sheet ES1 as in the above, and the obtained subjective satisfaction levels are stored in the activity history BMF6. Another index obtained from the sensor and stored along with the subjective satisfaction levels is, for example, an activeness level of the team. The activeness level is the active period during a conversation which is obtained by the method of FIG. 10, or an average of action exchange counts which are an indicator of how often a conversation has been held and which are obtained by the method of FIG. 10. For example, the first row in the activity history shows that the workers 2, 3, and 6 have been allocated to the same team, that a face-to-face encounter has been detected for sixty minutes from 10:01 on March 6, that results such as sales equivalent to four points have been generated, that an average of the satisfaction levels of the respective members on that day has been 1, and that the activeness level obtained from the sensors is 2.

Next, activity performance BMF7 (see FIG. 15C) which is a compilation of the performance of the respective workers is created from the activity history BMF6. The activity performance BMF7 is data that indicates for each worker how many times the worker has acted as a mediator in the past and how high a result he/she can produce as a mediator, namely, activity results of a mediator. By storing for each worker business operation results that are produced when the worker has acted as a mediator, subjective evaluations of participants, and an average value of conversation conditions or other types of data collected from the sensor, the stored values can be used as an indicator for estimating the worker's ability of producing results when the worker next time acts as a mediator.

For example, the number of times a worker has acted as a mediator in the past, an average face-to-face period of the worker's team, an average value of result amounts, an average value of satisfaction levels obtained from subjective evaluations, and an average value of activeness levels obtained from the sensors are stored in FIG. 15A. Activity results may be related to, in addition to differences from one mediator to another, general attributes such as the post, age, gender of the person in question. Whether or not the person of interest is active by nature and whether or not the person has many acquaintances also relate to activity results. Therefore, results compiled on a mediator attribute basis may be stored in the activity performance BMF7 in addition to compiled data of each individual member.

For example, average results may be compiled for each piece of stationary information of a mediator such as post, age, and gender. In the case where a mediator has a higher post than those of the other members on the team, data compiled in association with the mediator is counted as "higher rank" data of the activity performance. To give another example, the ratio of periods where a mediator is active is calculated from sensor data and the activeness list of FIG. 10, and whether or not the mediator is more active than average is determined. When the mediator is determined as more active than average, data compiled in association with the mediator is counted as "higher activeness" data of the activity performance. To give still another example, the cohesion of a mediator is determined in the manner of FIG. 12, and whether or not the calculated cohesion is higher than average is determined. When the cohesion of the mediator is higher than average, data compiled in association with the mediator is counted as "higher cohesion" data. Other values than these that can similarly be used as compilation standards include values compiled when a person who holds a high sales record has been a mediator, and the degree (the number of persons who can be reached over one path) and the betweenness (the ratio at which a node is on the shortest path between two persons with respect to all shortest paths between every two persons), which are indices in various social networks.

The activity history BMF6 and the activity performance BMF7 are referred to in performing the mediator determination BMFE and the team grouping processing BMFF. Specifically, in mediator determination, the reference is made when there are a plurality of mediator candidates for certain connection candidates. In this case, the activity performance BMF7 is referred to first to estimate the amount of results expected. For example, when one candidate has a higher post than those of other members and a higher-than-average activeness, averages of compilation results counted as "higher rank" and "higher activeness" are calculated as "average result: 3, average satisfaction level: 2, average activeness: 2.5". One way is to add up these three values, compare this sum of one candidate against this sum of another candidate, and the person who has the highest sum is selected.

In the team grouping processing BMFF, an average is calculated from the activity history for a mediator and each worker about results produced when the mediator and the worker are on the same team, and the average of the results is deemed as the congeniality between the mediator and the worker to avoid putting the two on the same team when the average of the results is low. The reference may be made also to draw out new results and to prevent workers from feeling a sense of staleness by, as in mediator determination, allocating persons who have been allocated to the same team in the recent past to different teams and avoiding putting them on the same team as each other in succession.

Sixth Embodiment

FIG. 16 and FIGS. 17A to 17H illustrate an example of a system for displaying the network structure to each user. In this embodiment, a management server detects from face-to-face data persons who are communicating with one user and displays the user and the detected persons on a display device. Thereafter, the user infers who among the detected persons are communicating, and the management server receives from the user as the result of the inference an input of information for identifying a communication. The management server determines whether or not an actually measured communication among the detected persons which is detected from the face-to-face data matches the information input by the user, and the result of the determination is displayed on the display device. In other words, instead of showing all results from the beginning, after the user inputs where around him/her the user imagines triangle structures are, the system checks the information input by the user against actual data and presents to the user the network structure along with the result of determining whether or not the information input by the user matches actual data. By focusing attention on triangle structures of an organization and comparing a user's inference against actual measurement that is obtained with a sensor device in this manner, the user's understanding and awareness of the network are raised and an effect of improving the productivity is expected.

Figure 16:
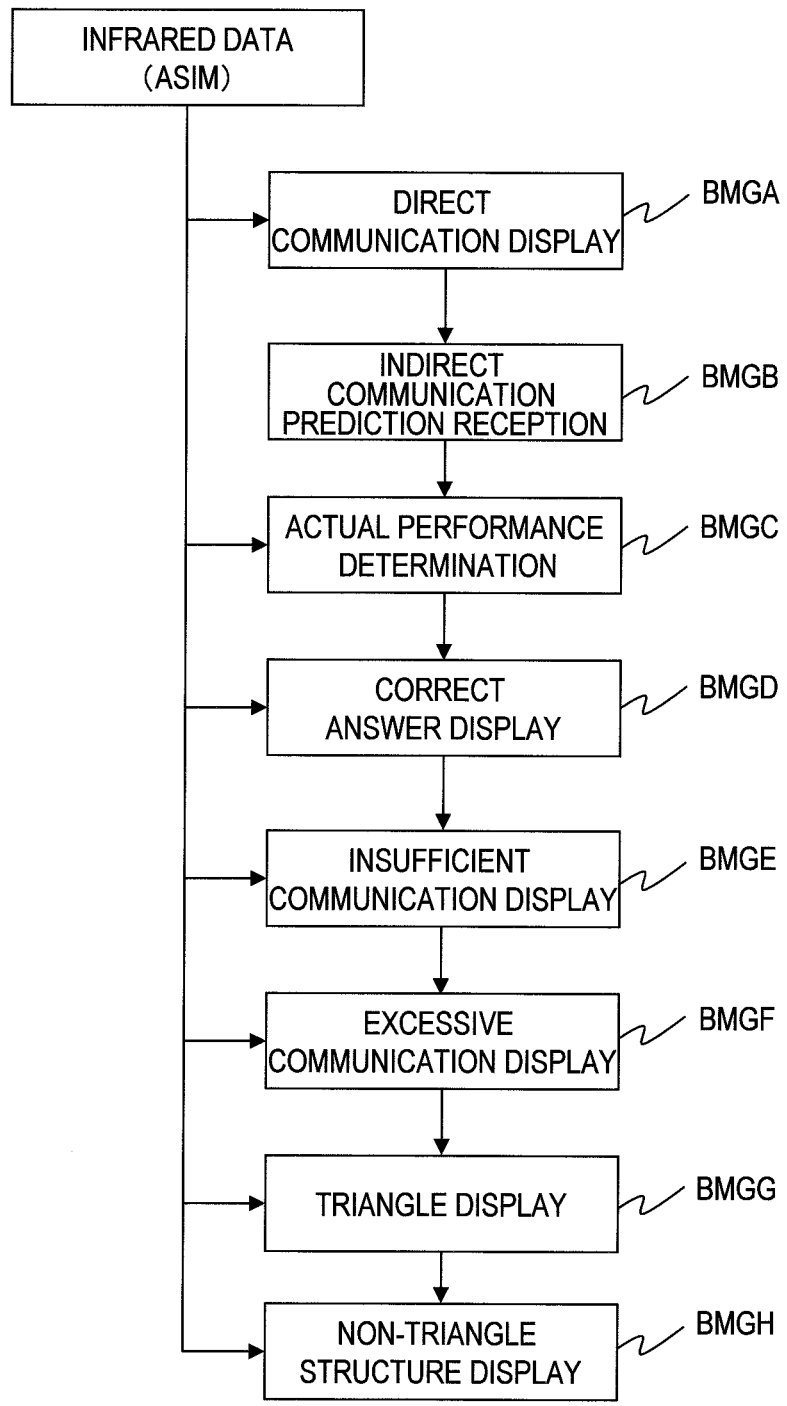
FIG. 16 is a flow chart of an example of comparing actual performance and prediction of communications according to the fourth embodiment of this invention.

FIG. 16 illustrates the flow of processing according to a sixth embodiment, and FIGS. 17A to 17H illustrate display screens that are presented to workers at the respective steps of the processing. The display screens of FIGS. 17A to 17F are intended for Mr./Ms. Arai at the center of the screens. First, in direct communication display processing BMGA, persons who have communicated with Mr./Ms. Arai who is the intended viewer are extracted from infrared data ASIM and placed around the intended viewer. Lines are drawn between the intended viewer and the extracted persons and displayed as in BMHA of FIG. 17A. In this embodiment, persons who communicate with an intended viewer and arranged around the intended viewer are called direct communication partners.

Next, in indirect communication prediction reception processing BMGB, Mr./Ms. Arai who is the user is prompted to input lines connecting persons who he/she thinks are communicating out of his/her direct communication partners. The input is made from the input computer PC1 via a keyboard, audio input, or a touch panel screen, and contains information with which two persons specified by the user can be identified. Lines connecting the two persons are drawn as specified by the user and displayed as in BMHB of FIG. 17B. This example is what is displayed when Mr./Ms. Arai who is the user predicts that there has been communications between Mr./Ms. Wada and Mr./Ms. Honda and between Mr./Ms. Wakui and Mr./Ms. Togawa.

Figure 17A:
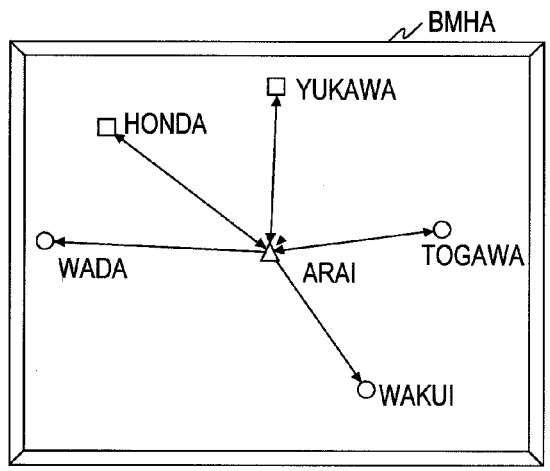
Figure 17B:
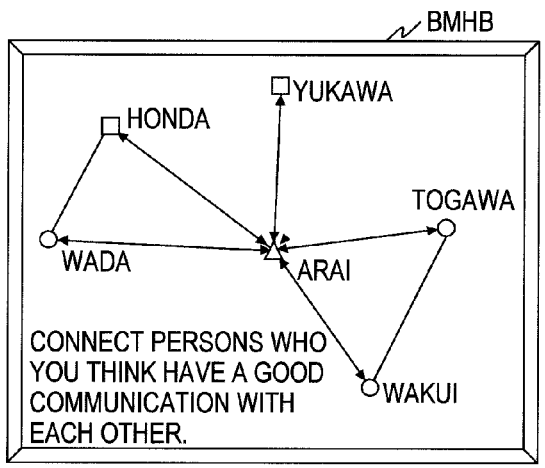
Figure 17C:
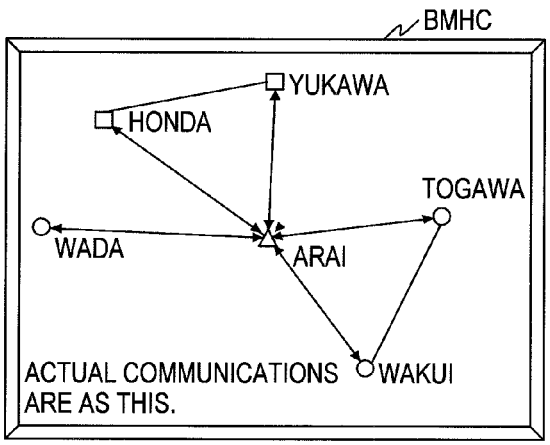
Figure 17D:
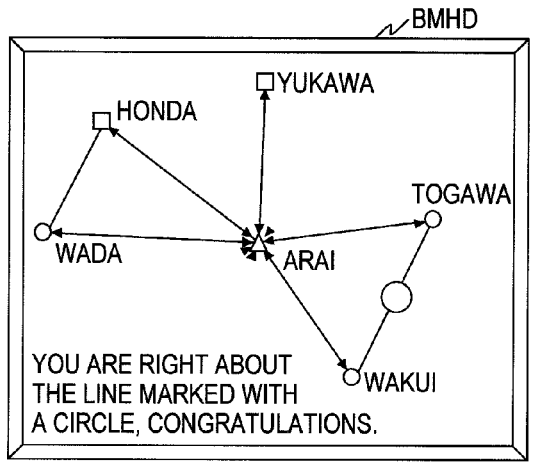

Next, in actual performance determination processing BMGC, a network graph is created as in FIG. 3 based on actual data of face-to-face encounters between the direct communication partners, and displayed as in BMHC of FIG. 17C.

Subsequently, in correct answer display processing BMGD, the user input BMHB is checked against the actual performance BMHC and lines that match, in other words, lines the user has predicted correctly are highlighted (for example, displayed as a different type of line or in a different color). For example, lines the user predicted correctly are made distinguishable by marking the lines with a circle as in BMHD of FIG. 17D.

Figure 17E:
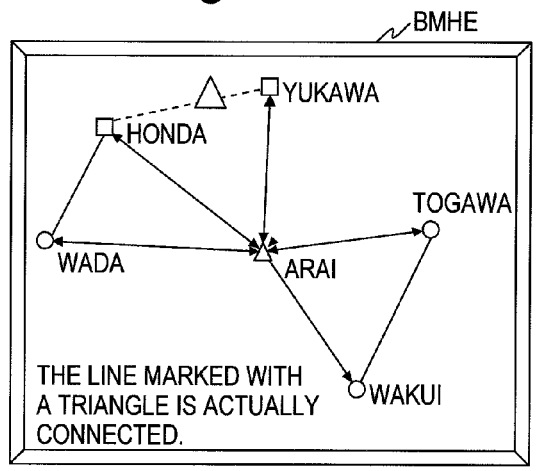
Figure 17F:
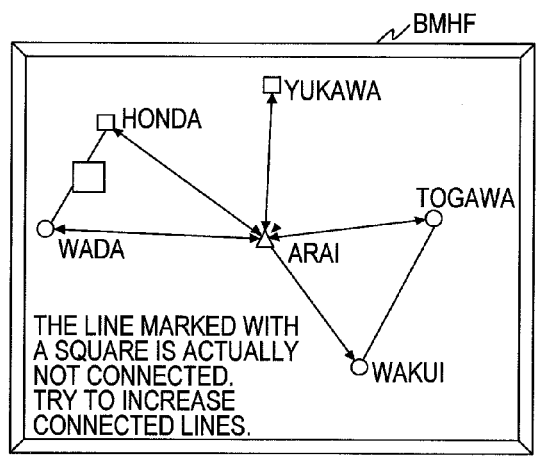

Next, in insufficient communication display processing BMGE, a communication that is found in the actual performance BMHC and not in the user input BMHB is highlighted as in BMHE of FIG. 17E. In the next excessive communication display processing, a communication that is not found in the actual performance BMHC and is found in the user input BMHB is similarly highlighted as in BMHF of FIG. 17F. This is a case where a user thinks that there is a communication but there is actually no communication. This kind of misperception has a risk of lowering productivity. The inventors of this invention have asked workers to make predictions as above and the accuracy of the predictions has not been high. Making a mismatch between a worker's perception and reality clear in this manner raises the awareness and understanding of the worker.

The next triangle display processing BMGG and non-triangle display processing BMGH are steps for listing triangles that are formed around the intended viewer and non-triangles which constitute V shapes around the intended viewer, and for displaying the triangles and the non-triangles in a manner easy to understand for the intended viewer. In the triangle display processing BMGG, out of all combinations of three persons that include the intended viewer, every combination that forms a triangle, in other words, every combination where the intended viewer, the first worker, and the second worker all communicate with one another, is extracted from the actual performance BMHC and displayed.

In the case of FIGS. 17A to 17H, triangles formed from the actual performance BMHC are among Mr./Ms. Honda, Mr./Ms. Arai, and Mr./Ms. Yukawa and among Mr./Ms. Togawa, Mr./Ms. Arai, and Mr./Ms. Wakui, two triangles in total, and are displayed as in BMHG. The non-triangle display processing BMGH is opposite to the triangle display and, out of all combinations of three persons that include the intended viewer, every combination that does not form a triangle, in other words, every combination where any two of the intended viewer, the first worker, and the second worker have not communicated with each other, is extracted from the actual performance BMHC and displayed. In the case of FIGS. 17A to 17H, there are eight types of non-triangles formed from the actual performance BMHC as in BMHH. Seeing the display, the worker can readily understand which communication between persons he/she is requested to promote.

The embodiments described above discuss examples where the network structure is analyzed and presented based on face-to-face information obtained with a sensor device. However, as described above, information that can be used is not limited thereto. For example, E-mail information may be used in a similar manner to construct a network structure and perform a similar analysis and presentation. Other than E-mail, a history of phone calls, chats, blog comments, and the like used for communications within an organization can be employed. Acquaintance relations in a social network service can also be employed.

Different types of data out of these pieces of communication information may be combined to perform a similar analysis and presentation. Prior to the analysis, the amount of data is normalized between the different types of data taking into account data amount and data quality. For example, in the case of E-mail which is one-way communication, transmitting E-mail twice is determined as an equivalent to one face-to-face encounter to calculate the total amount of communication among workers. From then on, the analyses and presentation described above can be performed.

Embodiments of this invention have now been described. However, this invention is not limited to the above-mentioned embodiments and the skilled in the art will understand that various modifications can be made to this invention and that the above-mentioned embodiments may suitably be used in combination.

INDUSTRIAL APPLICABILITY

This invention relates to a system for supporting communications within an organization, and more particularly, to a technology for improving communications of an organization.

This invention efficiently enhances the density of communications within an organization in a limited amount of time and increases triangle structures in number in a network. The productivity of the organization and the motivations of the individuals, among others, are thus improved.

What is claimed is:

1. A communication support device, which analyzes communications among a plurality of persons who belong to an organization, comprising:
   a recording module for storing data that indicates the communications among the plurality of persons;
   a network constructing module for constructing a network structure of the plurality of persons from the data that indicates the communications;
   an improvement candidate determining module for identifying a first person whose communication is to be improved from the data that indicates the communications; and
   a connection candidate determining module for identifying a second person and a third person who can help increase triangle structures around the identified first person in the network structure, based on the network structure,
   wherein the communication support device outputs display data for prompting the second person and the third person to communicate with each other;
   wherein the outputted display data shows the network structure as a first type of line and shows information prompting the communication as a second type of line different from the first type of line.

2. The communication support device according to claim 1, further comprising a cohesion calculating module for calculating cohesion of each of the plurality of persons from the data that indicates the communications,
   wherein the improvement candidate determining module identifies a person whose cohesion is smaller than a given threshold as the first person.

3. The communication support device according to claim 1, wherein the connection candidate determining module identifies two persons who increase the triangle structures most when a communication between the two persons is established as the second person and the third person.

4. The communication support device according to claim 1,
   wherein the network constructing module reconstructs the network structure after the display data for prompting the communication is output,
   wherein the communication support device further comprises an establishment determining module for determining whether a communication has been established between the second person and the third person based on the reconstructed network structure, and
   wherein the communication support device outputs display data which connects the second person and the third person with a third type of line different from the first type of line and the second type of line when the communication has been established.

5. The communication support device according to claim 4,
   wherein the plurality of persons each hold a terminal including an acceleration sensor,
   wherein the recording module records acceleration data which is obtained with the acceleration sensor and which is transmitted from the terminal,
   wherein the communication support device further comprises a measuring module for measuring a quality of the communication in a case where the communication has been established based on the acceleration data and the data that indicates the communication, and
   wherein the outputted display data includes the quality of the communication as attribute information of information prompting the communication.

6. The communication support device according to claim 1, further comprising a mediator determining module for identifying a fourth person who mediates between the second person and the third person as a mediator based on the network structure,
   wherein the communication support device outputs display data for prompting a team that includes the second person, the third person, and the fourth person to communicate.

7. The communication support device according to claim 6, wherein the outputted display data shows the network structure in which the second person, the third person, and the fourth person are shown with a symbol different from a symbol of another person, and a symbol indicating that the fourth person is the mediator is used.

8. The communication support device according to claim 6,
   wherein the recording module stores a business operation list which records details of business operations of the organization, and
   wherein the communication support device further comprises a business operation assigning module for assigning a business operation to the team that includes the second person, the third person, and the fourth person by referring to the business operation list.

9. The communication support device according to claim 6,
   wherein the recording module records a business operation result of the organization, an evaluation of the team, and activeness of the team, which are input from an input device, as an activity record in association with the mediator,
   wherein the communication support device further comprises an activity performance calculating module for calculating an activity result of the mediator from the activity record, and wherein the mediator determining module identifies a fifth person as a new mediator based on the calculated activity result.

10. A communication support system comprising:
a plurality of terminals which are held respectively by a plurality of persons belonging to an organization; and
a computer for processing data that is transmitted from the plurality of terminals to analyze communications among the plurality of persons,
wherein the plurality of terminals each include:
a sensor for obtaining data that indicates a communication with a person who holds another one of the plurality of terminals; and
a transmitter for transmitting the data that indicates the communication to the computer,
wherein the computer includes:
a recording module for storing the data that indicates the communication;
a network constructing module for constructing a network structure of the plurality of persons from the data that indicates the communication;
an improvement candidate determining module for identifying a first person whose communication is to be improved from the data that indicates the communication; and
a connection candidate determining module for identifying a second person and a third person who can help increase triangle structures around the first person in the network structure based on the network structure, and
wherein the computer outputs display data for prompting the second person and the third person to communicate with each other.

11. The communication support system according to claim 10,
wherein the computer further includes a cohesion calculating module for calculating cohesion of each of the plurality of persons from the data that indicates the communications, and
wherein the improvement candidate determining module identifies a person whose cohesion is smaller than a given threshold as the first person.

12. The communication support system according to claim 10,
wherein the network constructing module reconstructs the network structure after the display data for prompting the communication is output,
wherein the computer further includes an establishment determining module for determining whether a communication has been established between the second person and the third person based on the reconstructed network structure, and
wherein the computer outputs display data which connects the second person and the third person with a third type of line different from the first type of line and the second type of line when the communication has been established.

13. The communication support system according to claim 10,
wherein the computer further includes a mediator determining module for identifying a fourth person who mediates between the second person and the third person as a mediator based on the network structure, and
wherein the computer outputs display data for prompting a team that includes the second person, the third person, and the fourth person to communicate.

14. A communication support method, which analyzes communications among a plurality of persons who belongs to an organization, comprising:
storing data that indicates the communications among the plurality of persons;
constructing a network structure of the plurality of persons from the data that indicates the communications;
identifying a first person whose communication is to be improved from the data that indicates the communications;
identifying a second person and a third person who can help increase triangle structures around the first person in the network structure based on the network structure; and
outputting display data for prompting the second person and the third person to communicate with each other;
wherein the outputted display data shows the network structure as a first type of line and shows information prompting the communication as a second type of line different from the first type of line.

* * * * *